United States Patent [19]
Ichikawa et al.

[11] Patent Number: 5,793,724
[45] Date of Patent: Aug. 11, 1998

[54] OPTICAL DISK ERROR-CORRECTING CODE SYSTEM CORRELATING ERROR CORRECTION WITH SECTOR ADDRESS

[75] Inventors: Takahiro Ichikawa, Saitama; Shozo Masuda, Tokyo; Kazuhiro Yasuda, Kanagawa; Shigeharu Sato, Chiba, all of Japan

[73] Assignee: Sony Corporation, Tokyo, Japan

[21] Appl. No.: 785,395

[22] Filed: Jan. 21, 1997

[30] Foreign Application Priority Data

Jan. 22, 1996 [JP] Japan ..................... 8-028630

[51] Int. Cl.$^6$ ............................................. G11B 7/00
[52] U.S. Cl. .................... 369/60; 369/59; 369/48; 369/58
[58] Field of Search ............................ 369/59, 60, 47, 369/48, 49, 50, 54, 58, 32

[56] References Cited

U.S. PATENT DOCUMENTS

| | | | |
|---|---|---|---|
| 5,490,130 | 2/1996 | Akagiri | 369/60 X |
| 5,519,681 | 5/1996 | Maeda et al. | 369/60 |
| 5,555,229 | 9/1996 | Kojima et al. | 369/60 |
| 5,677,901 | 10/1997 | Iwamura | 369/60 |

*Primary Examiner*—Muhammad N. Edun
*Attorney, Agent, or Firm*—Frommer Lawrence & Haug LLP; William S. Frommer

[57] ABSTRACT

Error correction decoding apparatus decodes error correction encoded data reproduced from a recording medium by decoding the encoded data to produce decoded data in frame units and by generating decoding information in frame units; the decoded data and decoding information are stored in correspondence by frame unit and the decoded data and decoding information are retrieved from storage while frame synchronizing with address data representing a physical location of the encoded data on the recording medium.

24 Claims, 32 Drawing Sheets

MEMORY   LIST OF DATA
FRAME    ON MEMORY 0              01' 03' 05' ⋯ A9' -> EFM WRITE(00', 01', ... A8', A9')
1   00' 02' 04' ⋯ A8' 01 03 05 ⋯ A9 -> C1 READ (00', 02', ... 01, 03, ... A9)
2   00 02 04 ⋯ A8
3

| FRAME | DATA ADDRESS        | : → INFORMATION         |
|-------|---------------------|-------------------------|
| 0     | 00 01 02 03 04 ···  | A9 AA AB AC AD AE AF    |
| 1     | B0 B1 B2 B3 B4 ···  |                         |
| 2     |                     |                         |
| 3     |                     |                         |
| ⋮     |                     |                         |
| N     |       ···           | ···M···                 |
| ⋮     |                     |                         |
| 184   |                     |                         |
| 185   |                     |                         |

FIG. 10

|      | RESULTS OF ECC CORRECTION          |
|------|------------------------------------|
| BIT7 | UNCORRECTABLE (1:UNCORRECTABLE)    |
| BIT6 | C1C2 (0:C1 / 1:C2)                 |
| BIT5 | C12 (0:C1-1ST / 1:C1-2ND)          |
| BIT4 | PRESENCE OF ERRORS (1:PRESENT)     |
| BIT3 | NUMBER OF CORRECTIONS  $2^3$       |
| BIT2 | NUMBER OF CORRECTIONS  $2^2$       |
| BIT1 | NUMBER OF CORRECTIONS  $2^1$       |
| BIT0 | NUMBER OF CORRECTIONS  $2^0$       |

FIG. 11

FIG. 22A SCSY 
FIG. 22B main-FMSY 
FIG. 22C SUB 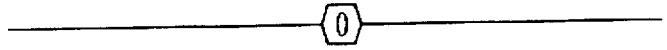
FIG. 22D MWEN 
FIG. 22E EFM+W Frame 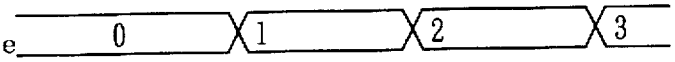
FIG. 22F PI1 Frame 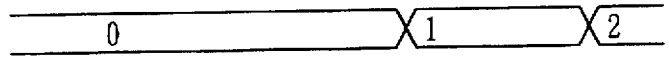

| BIT 7 | INTERPOLATION FLAG GENERATION MODE SETTING |
|---|---|
| BIT 6 | ECC BLOCK (1: LEADING SECTOR) |
| BIT 5 | START SECTOR DETECTION (1: DETECTED) |
| BIT 4 | END SECTOR DETECTION (1: DETECTED) |
| BIT 3 | DESCRAMBLE INITIALIZATION ADDRESS (BIT 3) |
| BIT 2 | DESCRAMBLE INITIALIZATION ADDRESS (BIT 2) |
| BIT 1 | DESCRAMBLE INITIALIZATION ADDRESS (BIT 1) |
| BIT 0 | DESCRAMBLE INITIALIZATION ADDRESS (BIT 0) |

FIG. 29

FIG. 26A SCSY 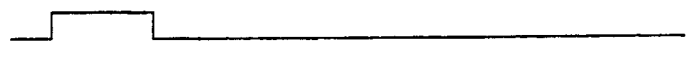
FIG. 26B main-FMSY 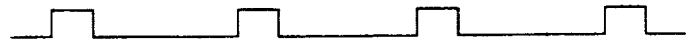
FIG. 26C SUB 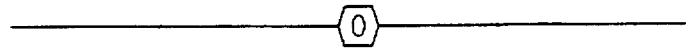
FIG. 26D SI[BIT 6] 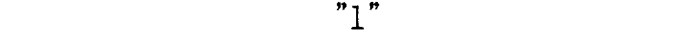
FIG. 26E block-top 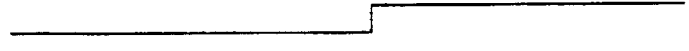
FIG. 26F MWEN 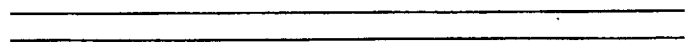
FIG. 26G EFM+W Frame 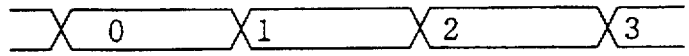
FIG. 26H PI1 Frame 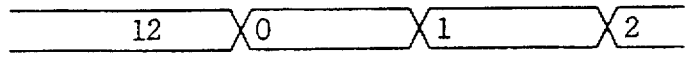
FIG. 27A SCSY 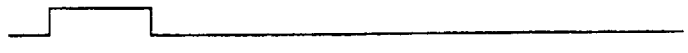
FIG. 27B main-FMSY 
FIG. 27C SUB 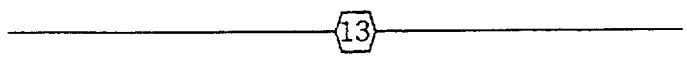
FIG. 27D SI[BIT 6] 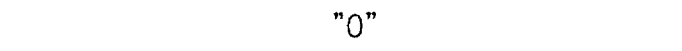
FIG. 27E block-top 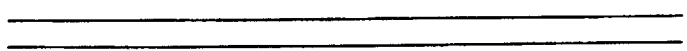
FIG. 27F MWEN 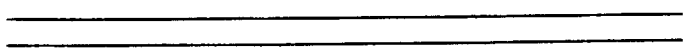
FIG. 27G EFM+W Frame 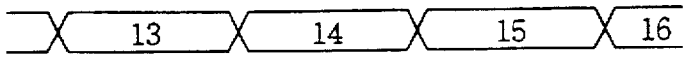
FIG. 27H PI1 Frame 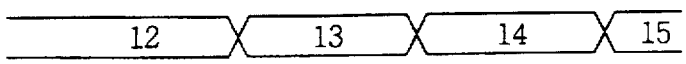

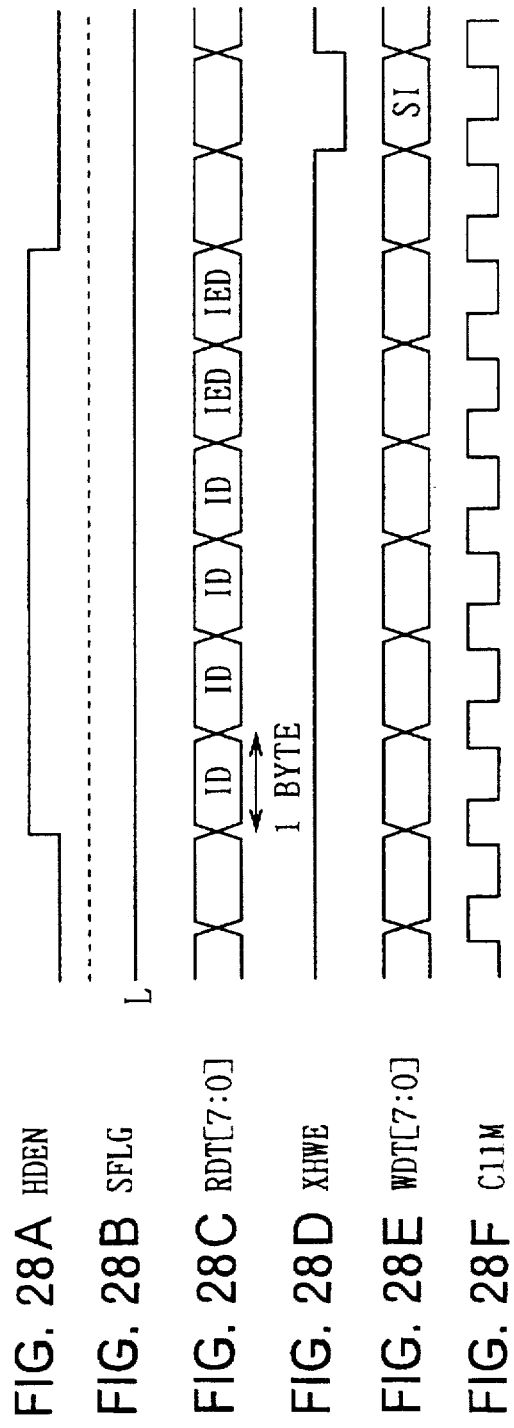

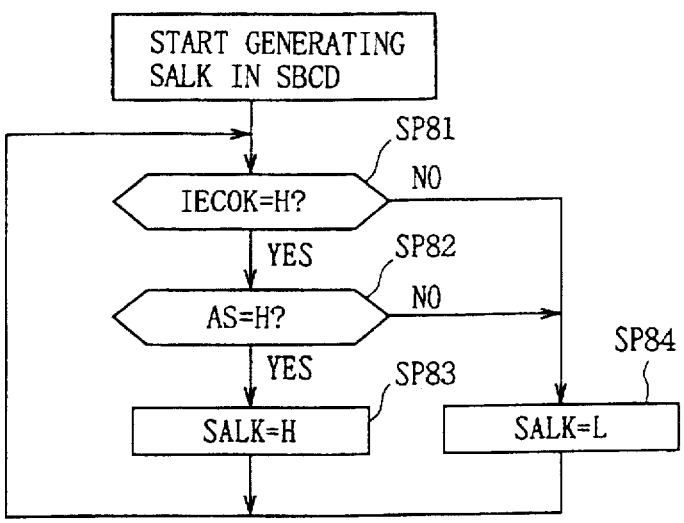
FIG. 32
FIG. 33A ESTT
FIG. 33B ECDE
FIG. 33C ECYE
FIG. 33D OSTT

FIG. 34A ECCK

FIG. 34B ESTT

FIG. 34C EDT[7:0]
EFLG

FIG. 34D ECCK

FIG. 34E OSTT

FIG. 34F ECOR

FIG. 34G O.CODEERR

FIG. 34H ECD[7:0]

FIG. 34I ECA[7:0]

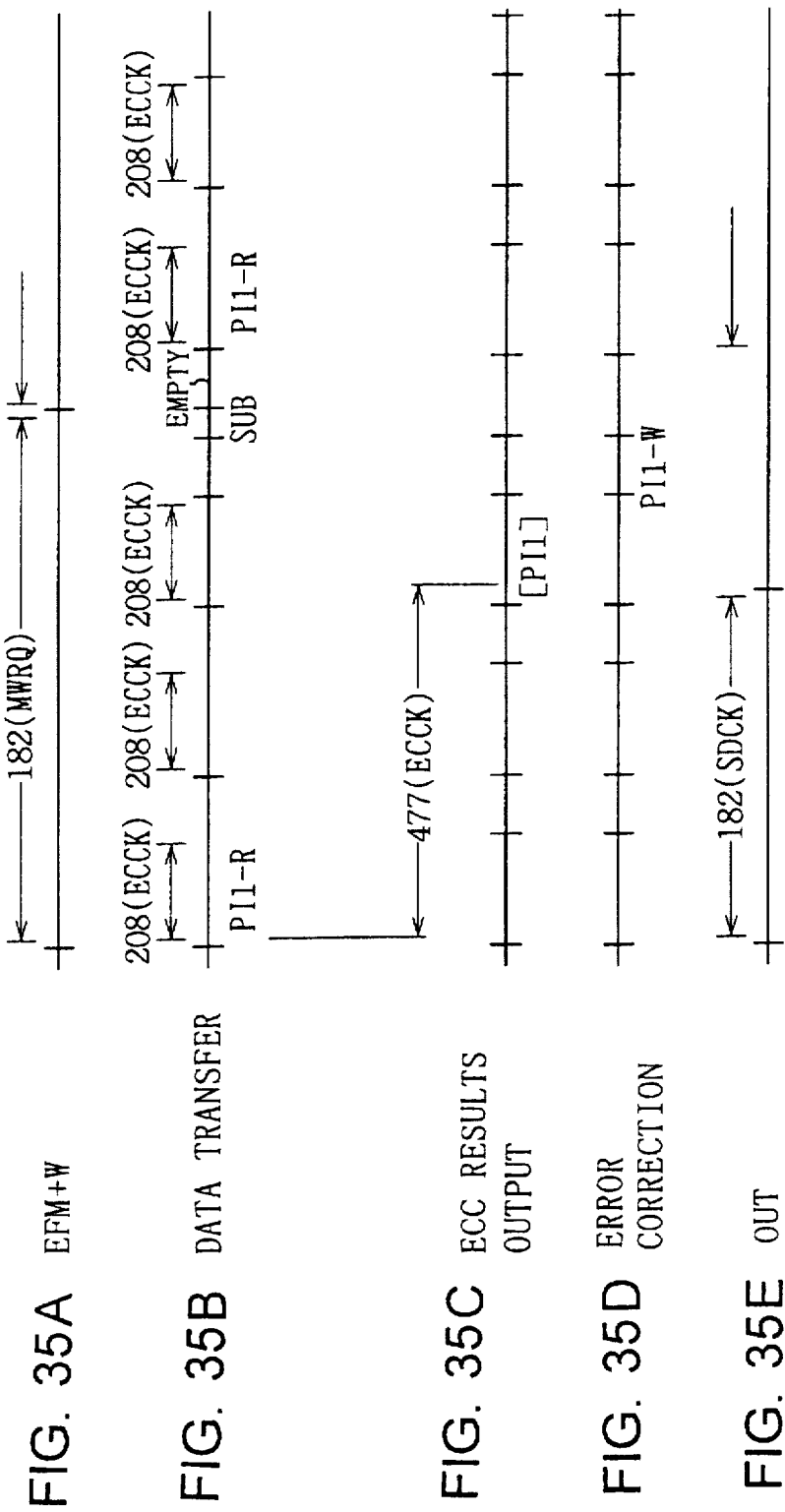

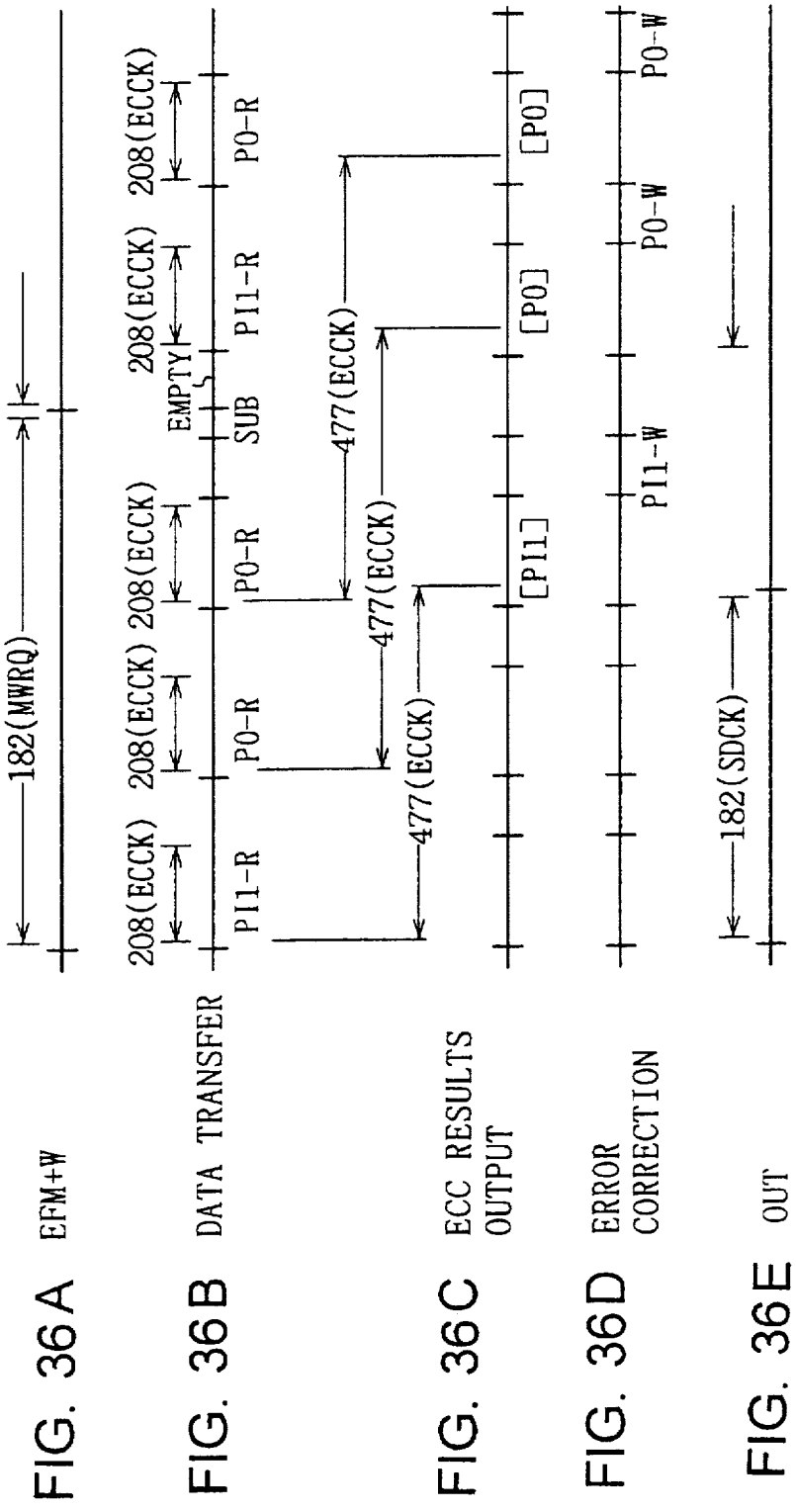

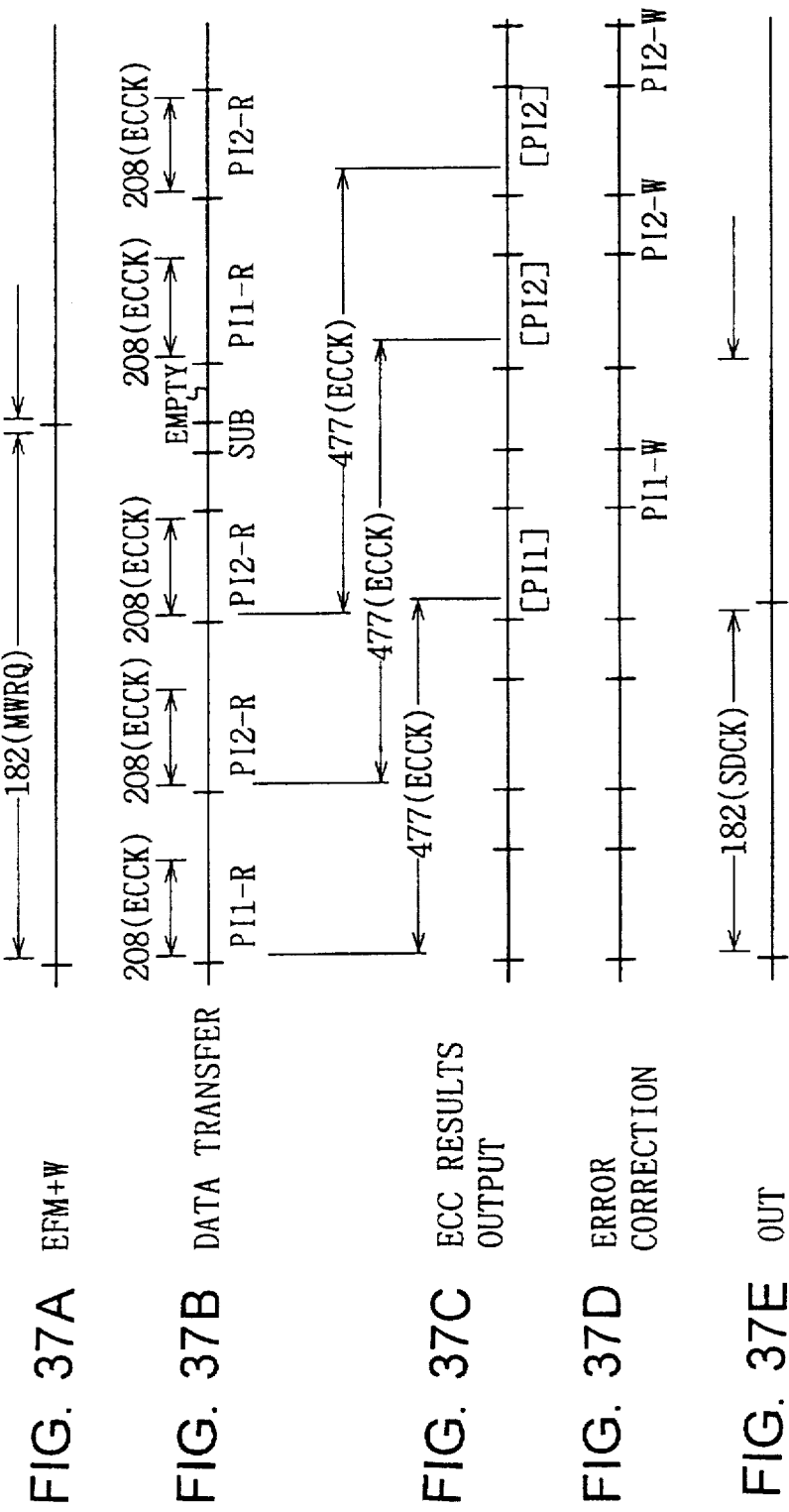

| BIT 7 | UNCORRECTABLE | (1:UNCORRECTABLE) |
|---|---|---|
| BIT 6 | PO | (0:PI/1:PO) |
| BIT 5 | PI2 | (0:PI1/1:PI2) |
| BIT 4 | NUMBER OF CORRECTIONS | (POSITION OF $2^4$) |
| BIT 3 | NUMBER OF CORRECTIONS | (POSITION OF $2^3$) |
| BIT 2 | NUMBER OF CORRECTIONS | (POSITION OF $2^2$) |
| BIT 1 | NUMBER OF CORRECTIONS | (POSITION OF $2^1$) |
| BIT 0 | NUMBER OF CORRECTIONS | (POSITION OF $2^0$) |

FIG. 40

| (EFM write)<br>WRITE OF EFM+−DEMODULATED DATA | 182 × 208 =37856 |
|---|---|
| (PI1 SERIES)<br>READ OF PI SERIES<br>ERROR CORRECTION OF PI SERIES<br>WRITE OF PI SERIES<br>　　　　CORRECTION RESULTS | 208 × 208 =43264<br>(10+10) × 208 = 4160<br>1 × 208 = 208 |
| (PO SERIES)<br>READ OF PO SERIES<br>ERROR CORRECTION OF PO SERIES<br>WRITE OF PO SERIES<br>　　　　CORRECTION RESULTS | 208 × 172 =35776<br>(16+16) × 172 = 5504<br>1 × 172 = 172 |
| (PI2 SERIES)<br>READ OF PI SERIES<br>ERROR CORRECTION OF P1 SERIES<br>WRITE OF PI SERIES<br>　　　　CORRECTION RESULTS | 208 × 208 =43264<br>(10+10) × 208 = 4160<br>1 × 208 = 208 |
| (ID SERIES)<br>READ OF ID SERIES<br>WRITE OF SECTOR INFORMATION | 6 × 208 = 1248<br>1 × 208 = 208 |
| (ID + USER DATA OUT)<br>READ OF SECTOR INFORMATION<br>READ OF CORRECTION RESULTS<br>　　　　INFORMATION<br>READ OF PI SERIES | 1 × 208 = 208<br>3 × 208 = 624<br><br>182 × 208 =37856 |
| TOTAL FOR 1 ECC BLOCK | 1074　　　214716 |
| AVERAGE PER MAIN FRAME | 215132/208= 1033 |

FIG. 42

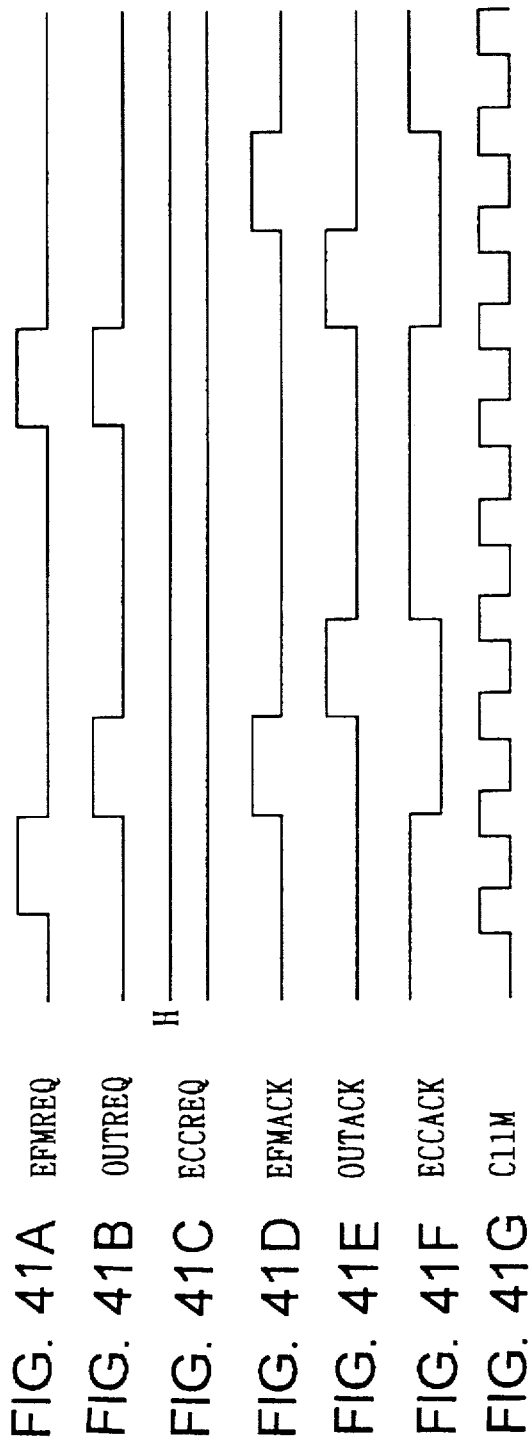
FIG. 41A EFMREQ
FIG. 41B OUTREQ
FIG. 41C ECCREQ
FIG. 41D EFMACK
FIG. 41E OUTACK
FIG. 41F ECCACK
FIG. 41G C11M

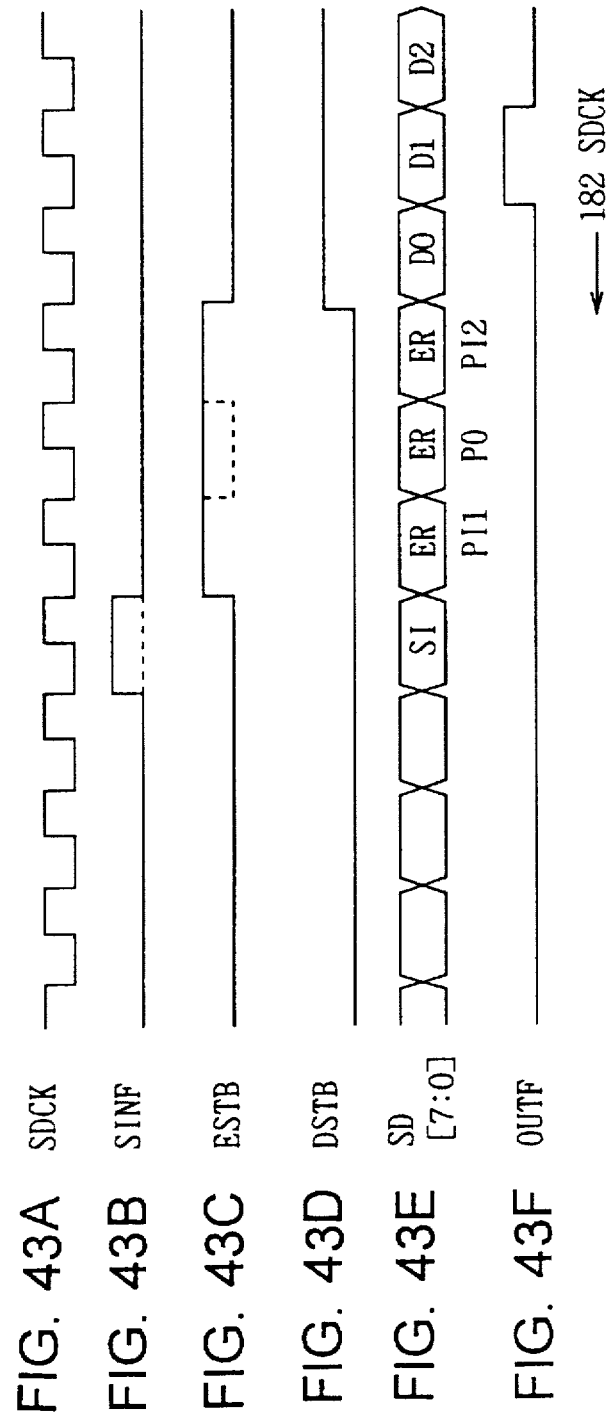

OPTICAL DISK ERROR-CORRECTING CODE SYSTEM CORRELATING ERROR CORRECTION WITH SECTOR ADDRESS

DESCRIPTION OF THE RELATED ART

This invention relates to an error-correcting code (ECC) system for correcting and analyzing errors occurring in digital data reproduced from an optical disk. More specifically, this invention relates to apparatus and methodology for analyzing the operation of an error-correcting code.

Video information, including images and sound, are commonly digitized, compressed, and recorded at a variable rate as digital data on a recording medium. According to an MPEG (Moving Pictures Experts Group) standard, video information is encoded into three types of pictures (or frames): an intra-coded picture (I-picture), a predictive-coded picture (P-picture), and a bidirectionally predictive-coded picture (B-picture). An I-picture is produced by intra-frame encoding a frame of video data. A P-picture is produced by forward predictive encoding a frame of video data with respect to another frame of video data, such as an immediately preceding frame. A B-picture is produced by bidirectonally predictive encoding a frame of video data with respect to multiple other frames of video data. Sets of I-pictures, P-pictures, and B-pictures may be grouped to form a group of pictures (GOP).

Audio data also may be digitized, compressed, and recorded according to an MPEG standard. Additionally, the audio data may be encoded by additive transform acoustic coding, such as ATRAC (trademark).

FIG. 1 illustrates data reproducing device 100 which reproduces data from optical disc 104 recorded at a variable rate. Device 100 includes tracking servo 102, pickup 106, ring buffer memory 108, multiplex data separator 110, video code buffer 112, video decoder 114, decoding system 116, track jump detector 126, audio code buffer 132, audio decoder 134, ring buffer controller 136, and system controller 138. Multiplex data separator 110 includes header separator 120, switch 122, and separator controller 130. Decoding system 116 includes demodulator 118, sector detector 124, and error-correcting code (ECC) circuit 128.

In a reproduction operation, pickup 106 irradiates optical disc 104 with a laser beam, detects the light reflected from the surface of the disc, and produces a corresponding reproduction signal S1. Reproduction signal S1 is supplied to demodulation circuit 118 for demodulation. The demodulated data is supplied to sector detector 124 and to ECC circuit 128. Sector detector 124 detects the sector number of disc 104 corresponding to the address at which the reproduced data is stored on the disc. The detected sector number is supplied to ring buffer controller 136. ECC circuit 128 detects and corrects errors in the demodulated data. The operation of decoding system 116 and of ring buffer controller 138 is controlled by system controller 138.

Demodulator 118 converts reproduction signal S1 to binary through RF processing and detects an EFM+ (8,16 conversion) sync pattern. Rough servo adjustment, according to the constant linear velocity (CLV) system, is applied depending upon the sync pattern detected in reproduction signal S1. Thereafter, upon detection of a sync header by sector detector 124 phase-locked loop (PLL) servo is applied. If the sync header is detected several times successively, EFM+ demodulated data S2 will be deinterleaved. Further details of the operation of decoding system 116 will be described in a following section in connection with the discussion of FIG. 2.

If sector detector 124 is unable to detect the sector number a sector number abnormal signal is supplied to track jump detector 126. If the demodulated data cannot be corrected by ECC 128, an error generation signal is supplied to track jump detector 126. ECC 128 supplies error-corrected data S10 to ring buffer memory 108 for temporary storage. Ring buffer controller 136 assigns a write address, write pointer WP, in ring buffer memory 108 corresponding to the address of the detected sector number provided by sector detector 124.

In response to a code request signal R10 from multiplex data separator 110, ring buffer controller 136 assigns a read address, read pointer RP, to corresponding data stored in ring buffer memory 108. Read pointer RP is supplied to ring buffer memory 108 which supplies the corresponding data S12 to multiplex data separator 110.

Header separator separates the pack header and packet header from the data supplied by ring buffer memory 108. The header data is supplied to separator controller 130 and the remaining data, time-division multiplexed data is supplied to input terminal G of switch 122. In accordance with stream identifier information contained in the packet header data, separator controller 130 controls the operation of switch 122 to demultiplex the time-division multiplexed data. In particular, switch 122 is controlled to systematically connect input terminal G with output terminals H1 and H2, thereby routing coded video data to video code buffer 112 and coded audio data to audio code buffer 132. Pursuant to data request signals received from video code buffer 112 and audio code buffer 132, multiplex data separator 110 generates code request signal R10.

In accordance with a data decoding operation, video decoder 114 generates data request signal R1 which is supplied to video code buffer 112. Depending upon its storage status, video code buffer 112 passes data request signal R1 to multiplex data separator 110 to request additional data. Buffer 112 temporarily stores coded video data received from separator 110. Video decoder 114 decodes the coded video data and supplies the decoded video data at output terminal OUT1.

In accordance with another data decoding operation, audio decoder 134 generates data request signal R2 which is supplied to audio code buffer 132. Depending upon its storage status, audio code buffer 132 passes data request signal R2 to multiplex data separator 110 to request additional data. Buffer 132 temporarily stores coded audio data received from separator 110. Audio decoder 134 decodes the coded audio data and supplies the decoded audio data at output terminal OUT2.

Tracking servo 102 and track jump detector 126 are conventional devices.

As illustrated in FIG. 2, ECC circuit 128 includes RAMs 202, 206, 210, and 214; and ECC decoders 204, 208, and 212. ECC circuit 128 processes EFM+ demodulated data S2 according to a C1/C2 convolution Reed Solomon decoding methodology (CIRCplus). Data S2 is received from sector detector 124, stored in RAM 24, and decoded in a three series process by ECC decoders 25, 27 and 29. First, C1 decoding is performed, then C2 decoding is performed, and finally C1 decoding is performed a second time (C12).

Operation of the ECC decoding process of ECC circuit 128 is illustrated in FIG. 3. EFM+ demodulated data S2 is written in the RAM 202 (EFM+ write) in the order of 00, 01, ... A8, A9 and 2 frames of EFM+ demodulated data is stored. Data S2 is supplied to ECC decoder 204 in the order of 00', 02', ... A8', 01, 03, ... A9 of a frame. ECC decoder 204 executes ECC decoding of C1 series data deinterleaved to produce C1 decoded data. C1 decoded data is supplied to RAM 206 (C1 write) for storage as shown in FIG. 4.

Error correction may be achieved by reading error positions and correction patterns from ECC decoder 204, simultaneously reading the corresponding erroneous data from RAM 202 (C1 read), and executing an exclusive logical sum with the correction pattern and the erroneous data.

ECC decoder 204 executes C1 series decoding for the C2 code series length, allowing C2 series decoding. ECC decoder 208 executes C2 series decoding upon C1 decoded data supplied from RAM 206 in the order of 00', 01', 02', 03', ... A9' (C2 read) to produce C2 decoded data. ECC decoder 208 executes C2 series decoding for the C1 code series length, allowing C1 series decoding. C2 decoded data is supplied to RAM 210 (C2 write) for storage as shown in FIG. 5.

Erasure correction may be achieved by transmitting an uncorrectable flag for each frame to the ECC decoder of the succeeding stage in synchronism with the data. For erasure correction of the C2 series, the uncorrectable flag of C1 will be used. In this case, the error correction operation is the same as in that of C1.

ECC decoder 212 executes C12 series decoding upon C2 decoded data supplied from RAM 210 in the order of 00', 01, 02, 03, ... A9 (C12 read) to produce C12 decoded data. For erasure correction of the C12 series, the uncorrectable flag of C2 will be used.

When error correction of C12 is completed, the ECC decoding result of C12 series will be written in the order of 00, 01, 02, 03, ... A9 in RAM 214. Thus, RAM 214 stores the ECC decoding results of C1, C2 and C12 series are stored and read out in the order of 00, 01, 02, 03, ... A9 (READ OUT). The decoding results are descramble processed and output to the ring buffer memory 108. Then, the necessary sector data will be written.

Since the number of errors processed in the ECC circuit 128 depends upon the accuracy with which the disc was cut, a measurement of the number of error processings in the ECC circuit 128 serves as an evaluation of disc quality. The position of the error can be determined by utilizing the sector address as an indication of position on the disc.

If data is convolutionally coded in the C1 and C2 series, in ECC decoding error correction is repeatedly executed in each series of the ECC decoding as C1, C2, C1. For example, the ECC decoding of the C2 series will be performed after the ECC decoding of the C1 series. Similarly, the second C1 series decoding is performed after the C2 and C1 series decoding are executed. Accordingly, if the result is output immediately following execution of ECC decoding, a time lag will occur with respect to the detection timing of the ECC result of the same C1 series.

Therefore, where an ECC result will be traced by system controller 138 to a position on the disc, the sector address detected by sector detector 124 is recorded and the ECC result is considered. The time lag between the sector address and the ECC result must be calculated before analysis of the ECC result and the recorded data. Such calculation is problematic due to its complexity.

Further, the data quantity per unit time to be supplied to ECC circuit 128 is proportional to the rotational speed of the disc. Thus, control timing for ECC processing may be affected by disc speed. As an additional problem, when accessing the disc at high speed, if an error result is output immediately after ECC processing is executed, it is difficult to correlate the respective error results of C11, C2 and C12 series with particular sector addresses on the disc.

OBJECTS AND SUMMARY OF THE INVENTION

In view of the foregoing, an object of the present invention is to provide error correction data decoding methodology and apparatus for detecting error positions on a disk while accessing to the disk at high speed.

Another object of the present invention is to provide methodology and apparatus for detecting error positions on a disc rotating at high speed without utilizing problematic complex calculations.

Still another object of the present invention is to provide methodology and apparatus for detecting errors on a disc, correlating an error with its physical address on a disc and with the result of an error correction process.

Yet another object of the present invention is to provide methodology and apparatus for detecting errors on a disc recording medium to determine the condition of the disc recording medium.

In accordance with an aspect of the present invention, a data decoding device for error correction decoding error correction encoded data reproduced from a recording medium is provided. The device includes error correction decoding circuitry for error correction decoding the error correction encoded data to produce decoded data in frame units and for generating decoding information in frame units. A memory device stores the error correction encoded data, the decoded data, and the decoding information. Memory control circuitry, coupled to the error correction decoding circuitry and to the memory device, controls the memory device to store the decoded data and the decoding information in correspondence by frame unit and retrieves the decoded data and the decoding information from the memory device while frame synchronizing with an address data representing a physical location of the error correction encoded data on the recording medium.

According to another aspect of the present invention, a data decoding method for error correction decoding an error correction encoded data reproduced from a recording medium is provided. This method includes the steps of error correction decoding the error correction encoded data to produce decoded data in frame units; generating decoding information in frame units; storing the error correction encoded data, the decoded data, and the decoding information; store the decoded data and the decoding information in correspondence by frame unit in a memory; and retrieving the decoded data and the decoding information from the memory while frame synchronizing with an address data representing a physical location of the error correction encoded data on the recording medium.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIG. 10 is a data diagram showing data stored in a RAM of FIG. 8;

FIG. 11 is a data chart detailing decoding information produced by an ECC circuit of FIG. 8;

FIGS. 22A to 22F are timing diagrams to which reference will be made in describing data storage operations;

FIGS. 26A to 26H are timing diagrams to which reference will be made in describing a block-top detection operation;

FIGS. 27A to 27H are timing diagrams to which reference will be made in describing post-block-top detection processing;

FIGS. 28A to 28F are timing diagrams to which reference will be made in describing a SUB-transfer process;

FIG. 29 is a schematic diagram showing the structure of a sector information;

FIG. 32 is a flowchart diagram showing a SALK generation process;

FIGS. 33A to 33D are timing diagrams to which reference will be made in describing an error correction operation according to an aspect of the present invention;

FIGS. 34A to 34I are timing diagrams to which reference will be made in describing an error correction operation according to an aspect of the present invention;

FIGS. 35A to 35E, 36A to 36E and 37A to 37E are timing diagrams to which reference will be made in explaining an ECC processing control operation according to an aspect of the present invention;

FIG. 40 is a data chart detailing decoding information produced by an ECC circuit of FIG. 39;

FIGS. 41A to 41G are timing diagrams to which reference will be made in describing bus arbitration;

FIG. 42 is a table to which reference will be made in explaining memory accessing during the correction of one ECC block according to an aspect of the present invention;

FIGS. 43A to 43F are timing diagrams to which reference will be made in describing error correction results.

DETAILED DESCRIPTION OF THE PREFERRED EMBODIMENTS

Figure 1:
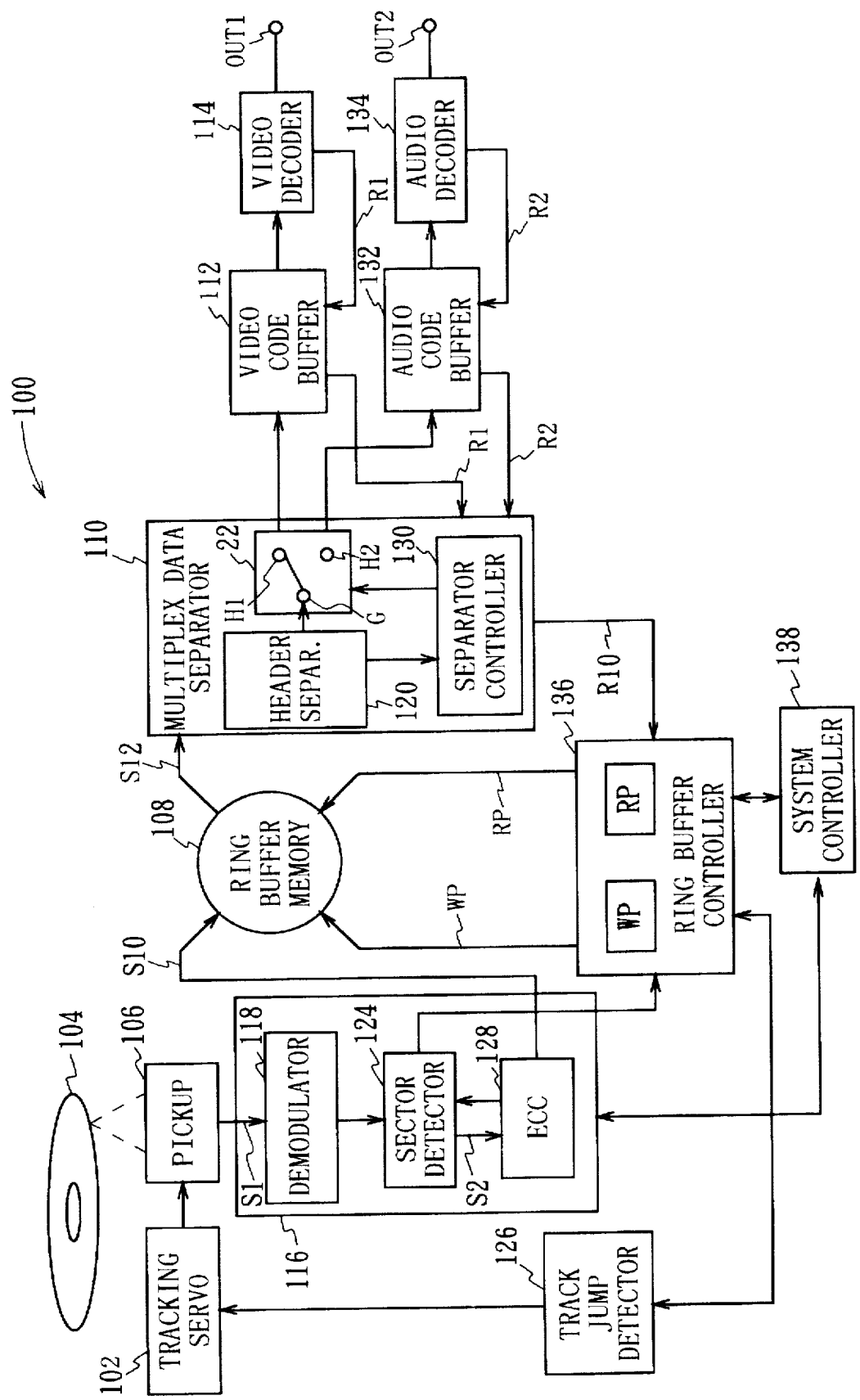
FIG. 1 is a block diagram of a data reproducing and error correction apparatus in the related art.
Figures 2, 3:
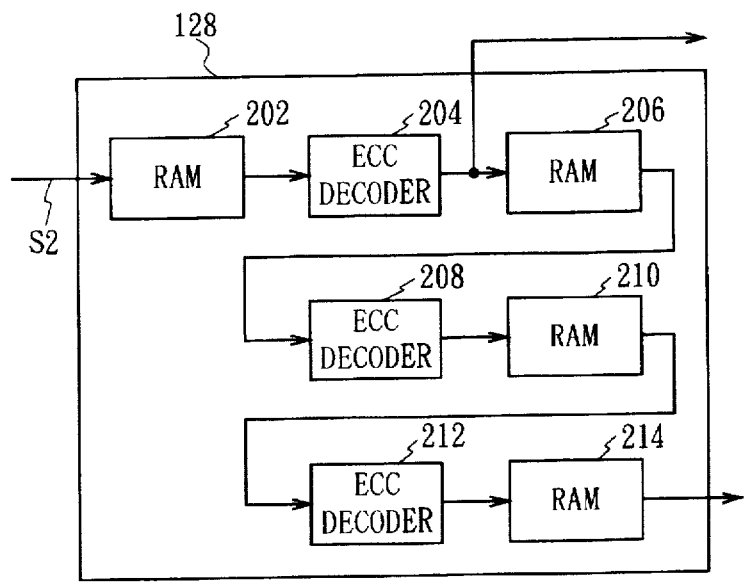
FIG. 2 is a block diagram of an ECC circuit of FIG. 1.
FIGS. 3, 4, 5, and 6 are schematic diagrams to which reference will be made in explaining data decoding processing by an ECC circuit in the related art.
Figure 4:
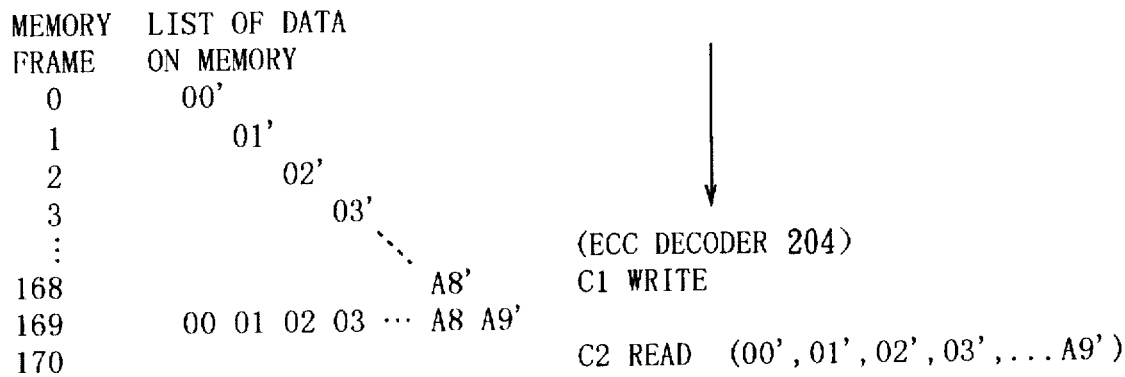
Figure 5:
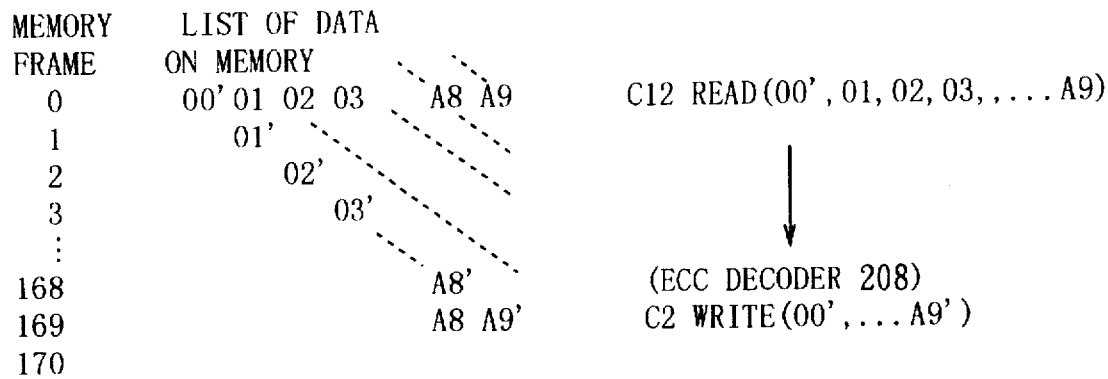
Figure 6:
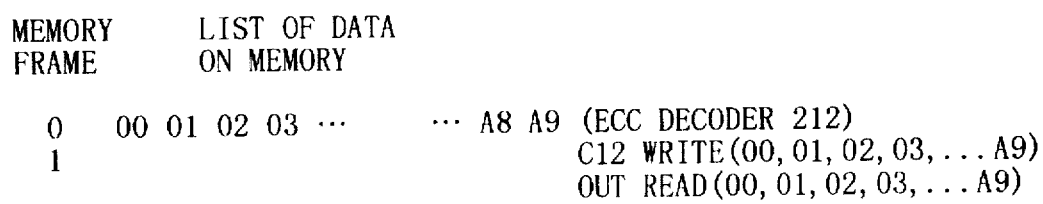
Figure 7:
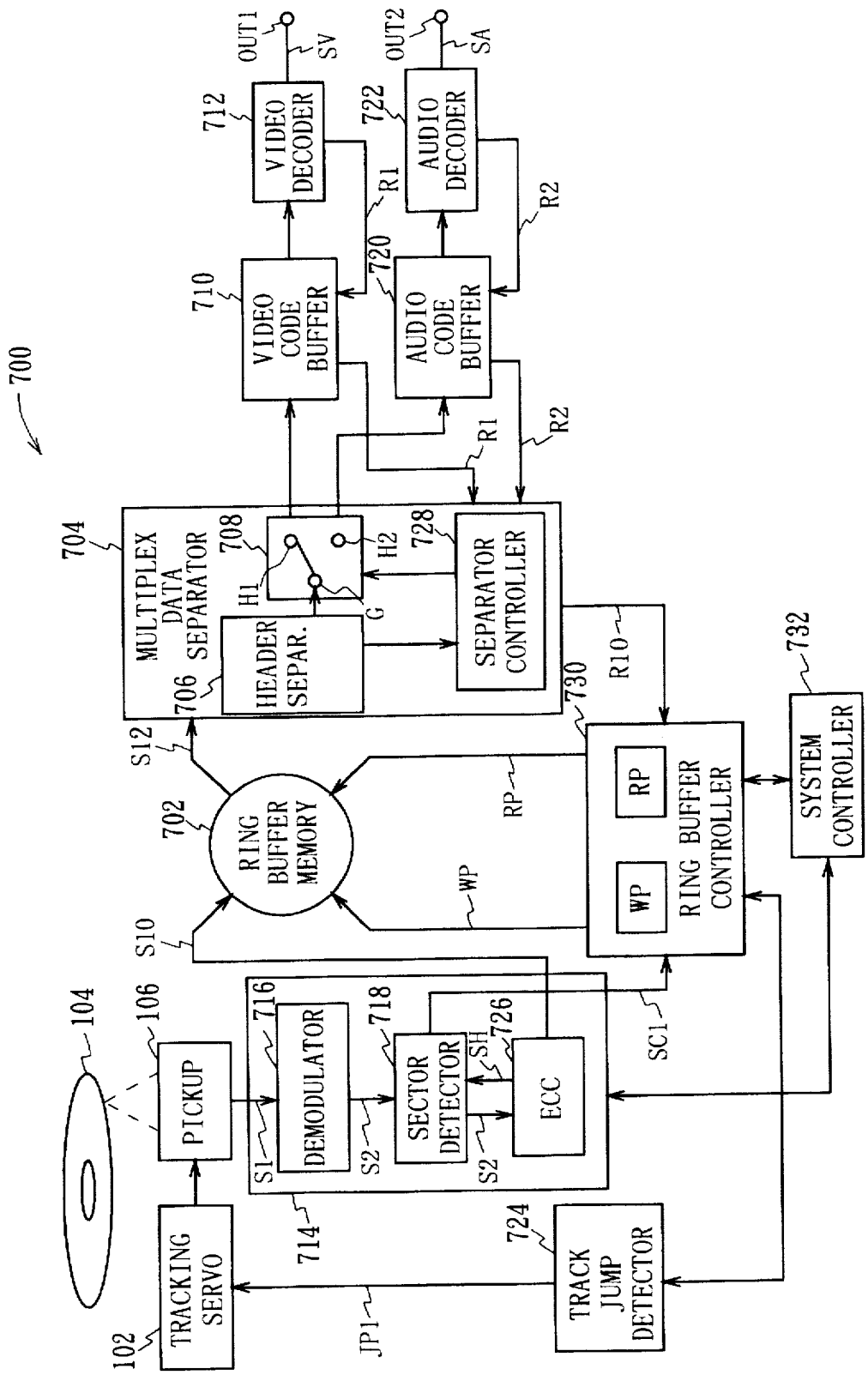
FIG. 7 is a block diagram of a data reproducing and error correction apparatus according to an embodiment of the present invention.

FIG. 7 illustrates a data reproducing and data decoding apparatus 700 according to an embodiment of the present invention. Components of apparatus 700 having the same structure and function as those of apparatus 100 are labeled with the same reference numerals utilized in FIG. 1. Data reproducing and data decoding apparatus 700 reproduces and decodes picture data and audio data from an optical disc 104 recorded at a variable rate.

As shown, apparatus 700 includes a tracking servo 102, a pickup 106, a ring buffer memory 702, a multiplex data separator 704, a video code buffer 710, a video decoder 712, a decoding circuit 714, a track jump detector 724, a ring buffer controller 730, and a system controller 732. Decoding circuit 714 includes a demodulator 716, a sector detector 718, and an error-correcting code (ECC) circuit 726. Multiplex data separator 704 includes a header separator 706, a switch 708, and a separator controller 728. Decoding circuit 714 and ring buffer controller 730 are controlled by system controller 732, a control device.

Tracking servo 102 and pickup 106 are conventional devices. Pickup 106, controlled by tracking servo 102, irradiates optical disc 104 with a laser beam and detects the pattern of light reflected from the surface of the disc. In response to the reflected light pattern, pickup 106 produces reproduction signal S1 representing the data recorded on optical disc 104. Reproduction signal S1 is supplied to demodulator 716.

Figure 8:
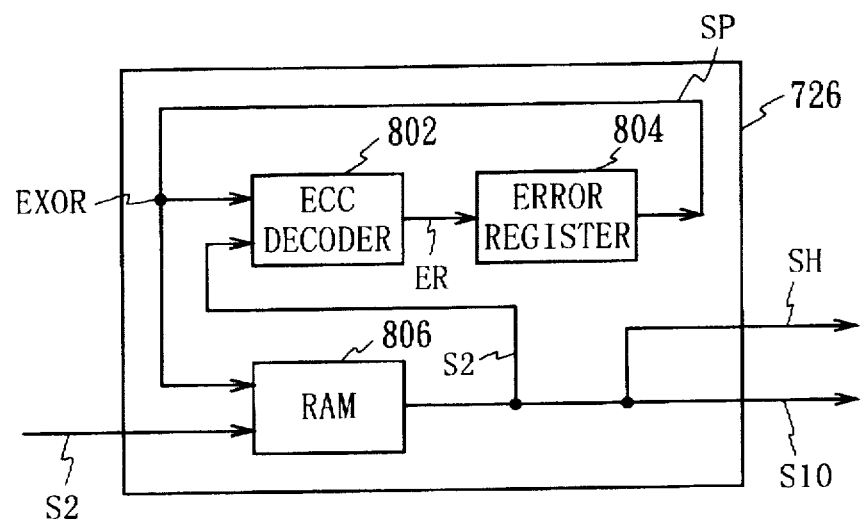
FIG. 8 is a block diagram of an ECC circuit of FIG. 7.

Demodulator 716 is a device for demodulating a modulated signal reproduced directly from a recording medium. A preferred construction of demodulator 716 is illustrated in FIG. 8 and will be discussed in a following section. Reproduction signal S1 is demodulated by demodulator 716 and the demodulated signal S2 is supplied to sector detector 718. Sector detector 718 is a detector device for determining the sector address of demodulated data reproduced from an optical disc. Sector detector 718 detects an address recorded in each sector of data represented by demodulated signal S2 and supplies the address, preferably a sector number, to ring buffer controller 730. Sector detector 718 also supplies the remaining data content of demodulated signal S2 to ECC circuit 718. This data transfer may occur during sector synchronization.

If sector detector 718 does not detect an address or if the detected addresses are not successive, sector detector 718 generates a sector number abnormal signal which is supplied to track jump detector 724 via ring buffer controller 730.

Ring buffer controller 730 is a control circuit for controlling the read and write operations of ring buffer memory 702 and for monitoring a data request signal R10 representing a data request by multiplex data separator 704. Ring buffer controller 730 assigns a write address, write pointer WP, in ring buffer memory 702 corresponding to the address of the detected sector number provided by sector detector 718. Ring buffer memory 702 is a ring buffer memory device having a first-in-first-out (FIFO) function.

ECC circuit 726 is an error-correcting code circuit for processing demodulated data and performing error correction. Detailed constructions of ECC circuit 726 are provided in FIGS. 8 and 9 which will be discussed in a following section. ECC circuit 726 detects errors in demodulated data S2, error-corrects the data by utilizing a redundancy bit recorded with the data, and outputs the error-corrected data S10 to ring buffer memory 702. ECC circuit 726 also detects sector header data in the demodulated data S2 and supplies such header data to system controller 732 via sector detector 726. If a data error could not be corrected by ECC 726, an error generation signal E10 is generated by ECC 726 and supplied to system controller 732.

Track jump detector 724 monitors the output of ring buffer controller 730 to detect when a track jump is required. When a track jump is required, track jump detector 724 generates a track jump signal JP1 which is supplied tracking servo 102. In response to jump signal JP1, tracking servo 102 controls pickup 106 to jump its reproduction operation by one track on optical disk 104.

When system controller 732 detects a sector number abnormal signal from sector detector 718 or an error generation signal from ECC 726, it controls track jump detector 724 to supply a track jump signal JP1 to tracking servo 102 to cause a corresponding adjustment in the reproduction operation of pickup 106.

Error-corrected data S10 stored in ring buffer memory 702 is supplied to multiplex data separator 704 as data S12 in accordance with control signals supplied by ring buffer controller 730. In response to a code request signal R10 from multiplex data separator 704, ring buffer controller 730 assigns a read address, read pointer RP, to corresponding data stored in ring buffer memory 702. Read pointer RP is supplied to ring buffer memory 702 which supplies the corresponding data S12 to multiplex data separator 704.

Multiplex data separator 704 is a demultiplexing device for demultiplexing time-division multiplexed digital data multiplexed, for example, according to a standard such as MPEG. Operation of multiplex data separator 704 is controlled by separator controller 728, a control device.

Header separator 706 is a header data detection and extraction device. Header separator 706 separates pack header data and packet header data from data S12 and supplies such header data to separator controller 728. The remainder of data S12, time-division multiplexed data, is supplied to the input terminal G of switch 708.

Switch 708 is a switching device having input terminal G and output terminals H1 and H2. The switching state of switch 708 is controlled by separator controller 728. Output terminals H1 and H2 are connected to the input terminal of video code buffer 710 and the input terminal of audio code buffer 720, respectively. In response to control signals from separator controller 728, switch 708 routes video data to video code buffer 710 and audio data to audio code buffer 720.

Video code buffer 710 and audio code buffer 720 are buffer storage memory devices. Video data stored in video code buffer 710 is supplied to video decoder 712 in response to a video data request signal R1 supplied by video decoder 712. Audio data stored in audio code buffer 720 is supplied to audio decoder 722 in response to an audio data request signal R2 supplied by audio decoder 722. Depending upon its operational state, video code buffer 710 passes video data request signal R1 to multiplex data separator 704 to request additional data. Also in dependence upon its operational state, audio code buffer 720 passes audio data request signal R2 to multiplex data separator 704 to request additional data.

Video decoder 712 is a video signal decoder for decoding demultiplexed but encoded video data. Decoder 712 supplies decoded video data SV to output terminal OUT1. Audio decoder 722 is an audio signal decoder for decoding demultiplexed but encoded audio data. Decoder 722 supplies decoded audio data SA to output terminal OUT2.

Since amount of data per unit time needed for decoding may fluctuate due to variations in the amount compression of various segments of image data, the rate at which video decoder 712 and audio decoder 722 request data from ring buffer 702 via multiplex separator 704 will vary. For example, processing of simple images will require less data from ring buffer memory 702.

As a consequence, ring buffer memory 702 could overflow as pickup 106 continues to reproduce data from disc 104. To avoid an overflow condition, track jump detector 724 calculates the current data quantity stored in ring buffer memory 702 from the locations of write pointer WP and read pointer RP. If the amount of data exceeds a predetermined reference value, ring buffer memory 702 outputs a track jump command to tracking servo 102. In this manner, the data quantity necessary for assuring proper flow of data from ring buffer memory 702 to multiplex data separator 704 is obtained by causing the optical disc 104 to turn during a waiting operation.

When track jump detector 724 detects the sector number abnormal signal supplied by sector detector 718 or the error generation signal supplied by ECC 726, it determines the data quantity remaining in ring buffer memory 702 from the locations of write pointer WP and read pointer RP. If the quantity of data in ring buffer memory 702 is large, such that underflow will be avoided even if data is read from memory 702 at the maximum transfer rate, track jump detector 724 will supply a track jump command (jump back) to tracking servo 102. Accordingly, tracking servo 102 causes pickup 106 to jump its reproduction position. Data on the disc corresponding to the error will be reproduced again by pickup 106. Ring buffer controller 730 slows or halts entirely the writing of new data into ring buffer memory 702 until the sector number detected by sector detector 718 equals the sector number for track jump. However, if the data quantity stored in ring buffer memory 702 exceeds a predetermined reference value, writing of data to memory 702 will not be restarted and the track jump operation will be executed again. Data stored in ring buffer memory 702 is transferred to the multiplex data separator 704 as needed.

FIG. 8 illustrates a preferred construction of error-correcting code (ECC) circuit 726 which provides ECC decoding according to a C1/C2 convolution Reed Solomon code (CIRC plus). As shown, ECC 726 includes ECC decoder 802, error register 804, and RAM 806. ECC decoder 52 is a decoding circuit for error-correcting EFM+ demodulated data and ECC-decoding such data. Error register 804 is a memory device for storing an error uncorrectable flag, an error correction pattern, and an error position. RAM 806 is a ring buffer memory device.

Figure 9:
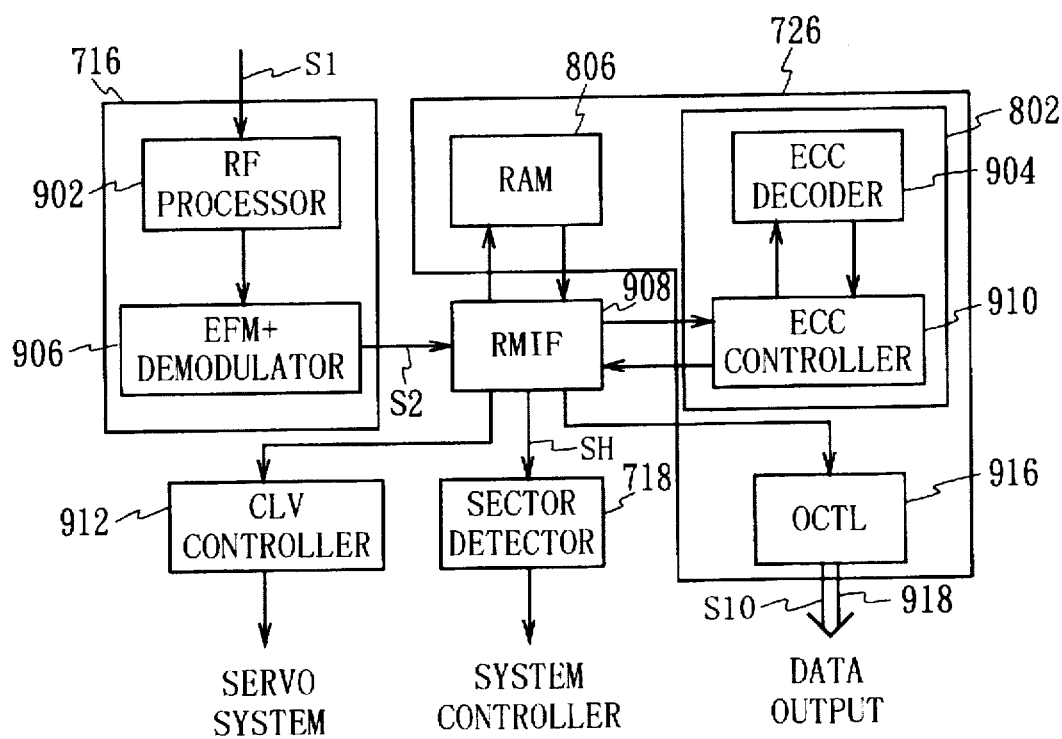
FIG. 9 is a block diagram to which reference will be made in explaining operation of a demodulator, a sector detector, and an ECC circuit of FIG. 7.

FIG. 9 illustrates a preferred construction of decoding circuit 714. As shown, decoding circuit 714 includes a demodulator 716, a sector detector 718, an ECC 726, a RAM interface (RMIF) 908, a constant linear velocity (CLV) controller 912, and a data bus 918. Random memory interface (RMIF) 908 is a memory interface device and constant linear velocity (CLV) controller 912 is a servo controller device.

As also shown in FIG. 9, demodulator 716 includes a RF processor 902 and an EFM+ demodulator while ECC decoder 726 includes RAM 806, ECC decoder 802, and output control circuit (OCTL) 916. RF processor 902 is a processing device and EFM+ demodulator is a device for demodulating signals modulated according to an EFM+ methodology. RAM 806 is a frame memory device and ECC decoder 802 is a decoding device. Output control circuit (OCTL) 916 is a data output device.

ECC decoder 802 is shown to include an ECC decoder 904 and an ECC controller 910. ECC decoder 904 is a decoding device. ECC controller 910 is a controller device.

The ECC decoding process is described in the following with reference to structures shown in FIGS. 8 and 9. Reproduction signal S1 is RF-processed and binary coded in RF processor 402 and an EFM+ synchronization pattern is detected by demodulator 716. If an EFM synchronization pattern is detected, rough servo control is provided by CLV controller 912. Thereafter, if the sync pattern of EFM+ is detected by demodulator 716, phase-locked loop (PLL) servo control is provided. Upon several successive detections of the sync pattern, the EFM+ demodulated data S2 is deinterleaved and written into RAM 806 via RMIF 908 in frame units. Data S2 will be error corrected and then output to ring buffer memory 702 through OCTL 916.

ECC circuit 726 supplies the write address of decoded data S2 to RAM 806 via RMIF 908 which is controlled by the system controller 732. Data read from RAM 806 is transferred to ECC control section 910 and an ECC decoder 904 through RMIF 908.

If an error is detected and is correctable, the error position and the correction pattern of the error are output from ECC decoding section 904 to ECC controller 802. The error position and error correction pattern are output in frame units to RAM 806 and stored in error register 804.

The error is corrected by obtaining the error position and correction pattern from error register 804, obtaining the error data corresponding to the error position from RAM 806, and executing exclusive logical sum (EXOR) with the error data and a correction pattern SP. The corrected data is written to RAM 806.

If an uncorrectable error is detected, the uncorrectable flag for the frame is stored by error register 804 to use in the erasure correction operation at a subsequent stage.

In this manner, error register 804 stores the error position and correction pattern for each series C1, C2 and C12 as needed for ECC processing. Once the necessary data, e.g. error position and correction pattern SP, is obtained, data S2 stored in RAM 806 is error corrected.

Following error correction and ECC decoding, the decoded data S10 and sector header data SH are separated and supplied to ring buffer memory 702 and sector detector 718, respectively. Through sector detector 718, sector header data SH is supplied to ring buffer controller 730. Ring buffer controller 730 causes the decoded data S10 to be stored in ring buffer memory 702 in accordance with the sector header data SH.

The memory address of data (RA) can be calculated by the RMIF 908 by utilizing the following equations with the order of data Dn in the C1 direction and the frame output number Fn in C1 code units which are based on the data addresses in RAM 806 shown in FIG. 10. In the following, numbers are recited in hexadecimal.

Dn: data No. (00–A9)

Fn: frame No. (00–B9)

RA: RAM address (0000–7FFF)

Fna=Fn+46+01

IF (ECC MODE=C2) then Fna=Fna+Dn $$IF\ (Fna>FF)\ then\ Fna=Fna+46-100 \tag{1}$$

(Dn=00) AND (00<Dn<80)

$$RA=[(Fna)\times 80]+Dn[6:0] \tag{2}$$

(Dn=80) AND (80<Dn<A0)

$$RA=[(Fna+18)\times 20]+Dn[4:0] \tag{3}$$

(Dn=A0) AND (A0<Dn<AF)

$$RA=[(Fna+BA-100)\times 10]+Dn[3:0] \tag{4}$$

RMIF 908 writes to RAM 806 the results of ECC decoding of:

the three series C1, C2 and C12 to an address of AAth, ABth, ACth, ADth, AEth and AFth of the frame including the data leading each series. When the ECC result is written to AA, AB, AC for example, the memory addresses RA in RAM 806 corresponding to the results of the ECC decoding for the three series C1, C2 and C12 can be easily generated by utilizing the frame number Fn and the data numbers AA, AB and AC.

The ECC result ER, the error information corresponding to coded data recorded on optical disk 104, is represented with 8 bit data of a format illustrated in FIG. 11. According to this format for ER, the number of ECC corrections is set in bits 0, 1, 2 and 3; the presence or absence of an error is set in bit 4; the ECC result of the C12 series is set in bit 5; an indication that the ECC result is from the C1 series or the C2 series is set in bit 6; and an indication that the error is uncorrectable is set in bit 7. Use of the above format enables monitoring the presence and absence of errors but also the number and types of ECC corrections.

Figure 12A:
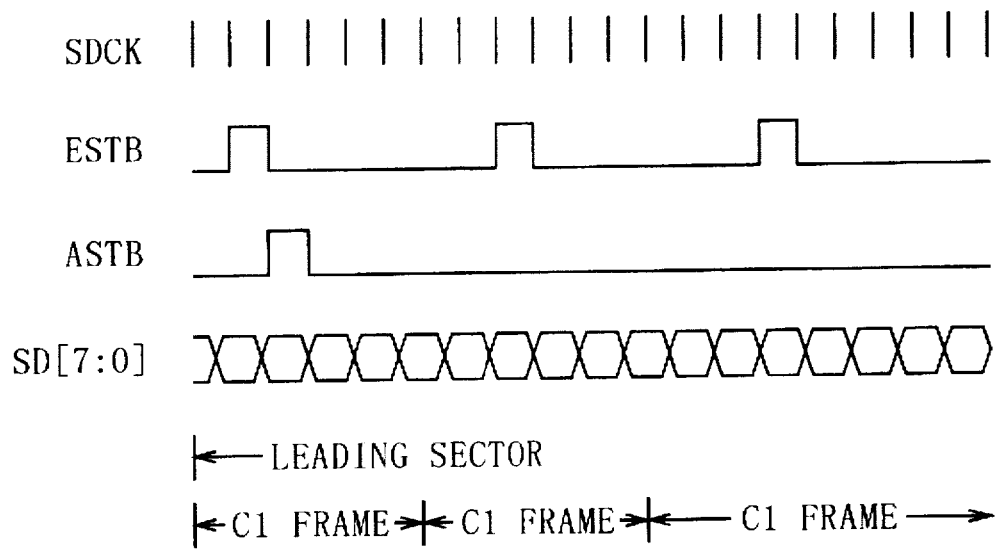
FIGS. 12A and 12B are timing charts to which reference will be made in explaining operation of an ECC circuit of FIG. 8.
Figure 12B:
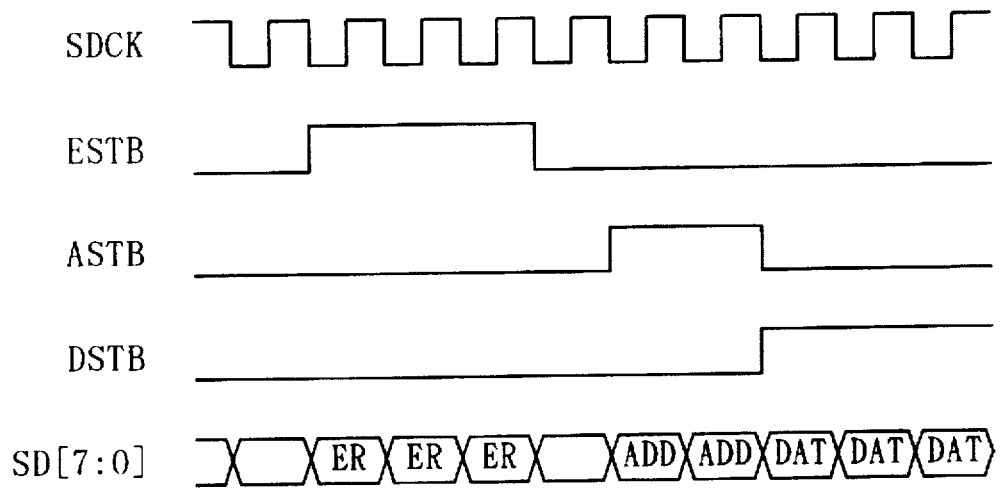

FIGS. 12A and 12B show an example of the output timing of ECC result ER. FIG. 12B is a magnification of one frame cycle in FIG. 12A. After ECC decoding has been executed, the ECC decoding results ER of the three series C1, C2 and C12 are output in frame units together with the sector address data. The user data DAT (e.g. video data and/or audio data), sector address data ADD and ECC results ER read from RAM 806 through RMIF 908 is output through a bus 918 via OCTL 916. Strobe signals (ASTB, DSTB, ESTB) are added to each data to determine the data contents.

In apparatus 700, to provide an adequate data quantity for decoding processing, it is preferred that in an RFCK, the channel bit rate of reproduction is set to a value larger than the reference channel bit rate of 26.6 Mbits/s at disk recording (cutting).

When ECC decoding by ECC circuit 726 is completed, the error strobe signal ESTB giving the output timing of the ECC results ER is output from OCTL 916 to the frame ECC-decoded normally. For example, as shown in FIG. 12B, for a frame in which only the C1 series can be decoded due to the difference in interleave length, ER of the C1 series is output as ESTB=1.

Address strobe signal ASTB giving the output timing of the sector address ADD on disc 104 is successively output. By reading data during the period when the address strobe signal ASTB=1, the position on optical disk 104 corresponding to the read frame can be confirmed. As shown in FIG. 12A, since the sector address ADD is positioned at the beginning frame of a multi-frame sector, ASTB=1 for the frame having the sector address ADD. Accordingly, the immediately following data strobe signal DSTB indicates user data DAT (FIG. 12B).

Figure 13:
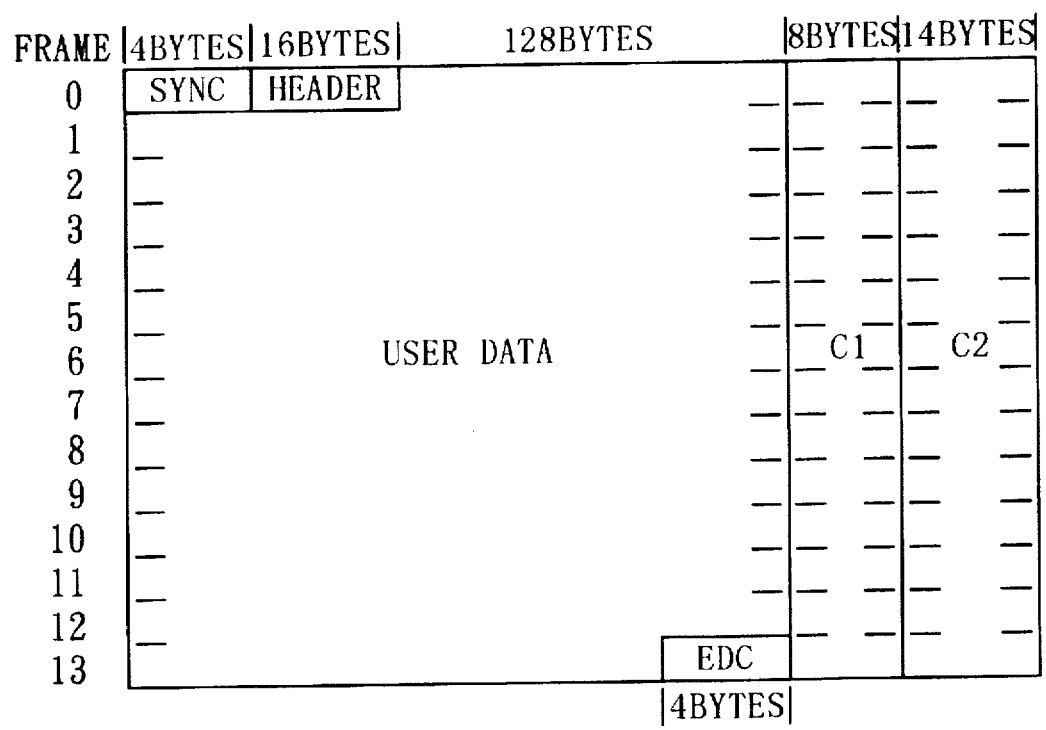
FIG. 13 is a data format diagram showing the format of data output from an ECC circuit of FIG. 8.

FIG. 13 illustrates a preferred sector format for the S10 data output from bus 918. After 3 bytes of error result ER are output, sync data, header data, and user data are output for each frame.

User data DAT decoded by RMIF 908 and ECC result ER for each series of user data DAT is read out from RAM 806 and supplied as output data S10 with sector address data ADD while frame synchronizing user data DAT with the ECC result ER. By this process, the ECC result ER corresponding to the sector address ADD of the optical disk 104 is easily detected. Accordingly, an error detected in data reproduced from a disc and ECC correction thereof is easily analyzed. Even if the disc is accessed at high speed, an ECC error may be analyzed at almost the same time as data is reproduced from the disc.

Figure 14:
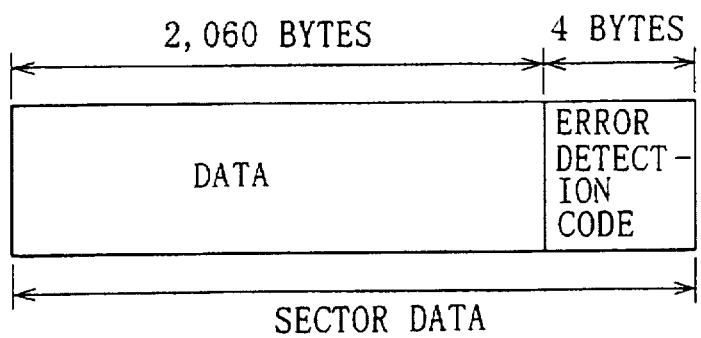
FIG. 14 is a data format diagram showing the structure of sector data.

FIGS. 14 to 17 illustrate a data format according to another embodiment of the present invention wherein data is recorded units of one cluster (32 Kbytes). As shown in FIG. 14, two Kbytes (2,060 bytes) of data is extracted as one sector and 4 bytes of overhead is added. The overhead includes error detection codes (EDC) for detecting errors.

Figure 15:
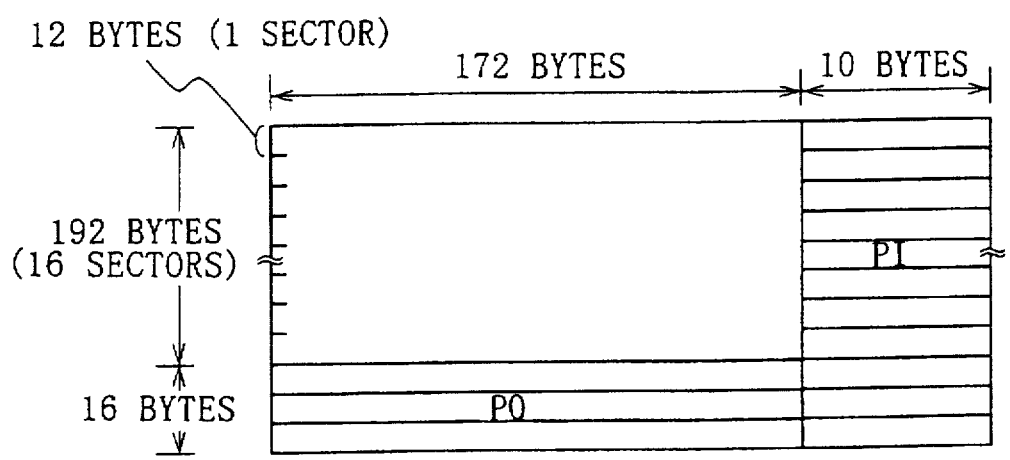
FIG. 15 is a data format diagram showing the structure of an ECC block.

As shown in FIG. 15, 2,064 (=2,060+4) bytes of data corresponding to one sector is formed as 12×172 (2,064) bytes of data. Sixteen data sectors are collected and constituted as 192 (=12×16)×172 bytes of data. Outer codes (PO) of 16 bytes are added to the 192×172 bytes of data for each byte in the vertical (column) direction as a parity. Inner codes (PI) of 10 bytes are added to the 208 (=192+16)×172 bytes of data and PO parity for each byte in the horizontal (row) direction as a parity.

Figure 16:
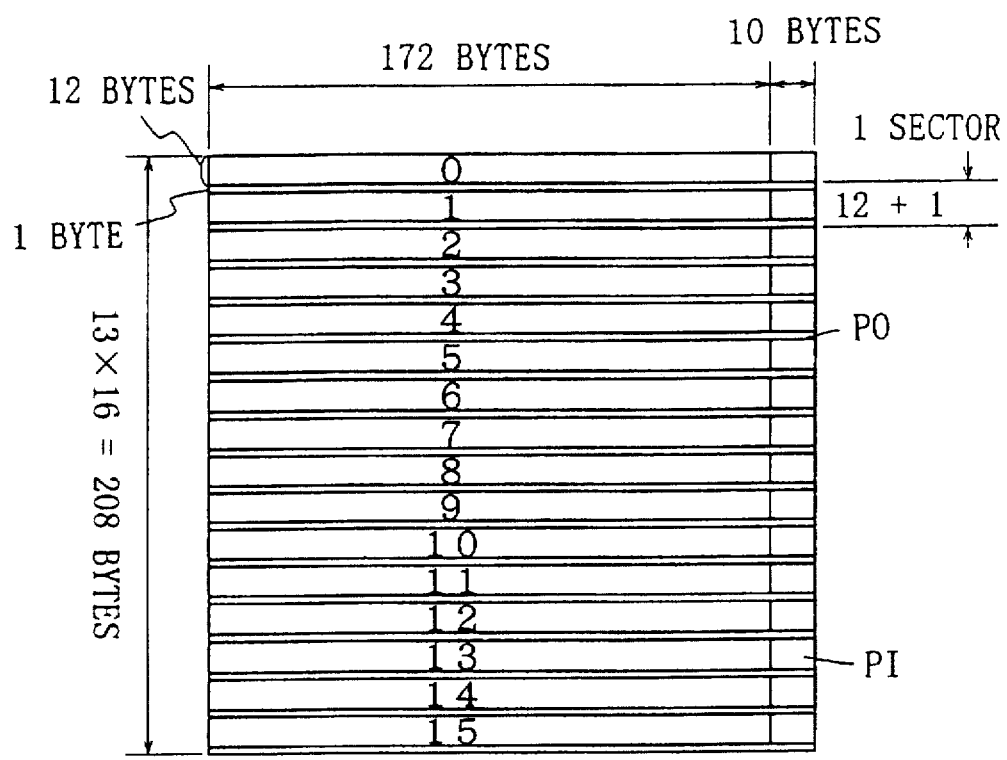
FIG. 16 is a schematic diagram showing the interleaving of PO parities (outer codes)

As shown in FIG. 16, data blocked into 208 (=192+16) ×182 (=172+10) bytes, the outer code (PO) row of 16×182 bytes is partitioned into 16 rows of 1×182 bytes, each of which is inserted below each of the 16 sector data each comprising 12×182 bytes, numbered from 0 to 15, and interleaved. Accordingly, one sector data comprises 13 (=12+1)×182 bytes.

Figure 17:
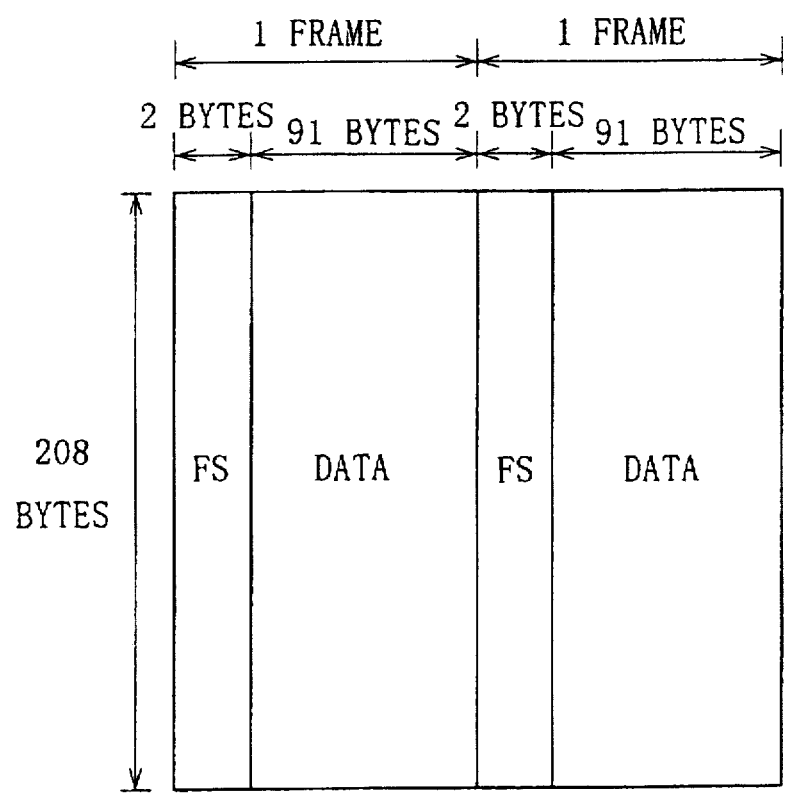
FIG. 17 is a data format diagram showing the structure of a data block.

The 208×182 bytes of data shown in FIG. 16 is vertically divided into two frames as shown in FIG. 17. A block of 91 bytes is treated as one frame. A frame synchronization signal (FS) of 2 bytes is further added to the beginning of each 91 byte frame of data. Consequently, the data in one frame amounts to 93 bytes in total, and the entire data structure is constituted as 208×(93×2) bytes, as shown in FIG. 17. This is defined as one cluster (one ECC block) of data. The size of the actual data section, excluding the overhead section, is 2 Kbytes (=2,048×16/1,024 Kbytes).

One cluster (one ECC block) is composed of 16 sectors, and one sector consists of 24 frames. In an alternative embodiment, data is recorded on optical disc 104 in clusters.

Figure 18:
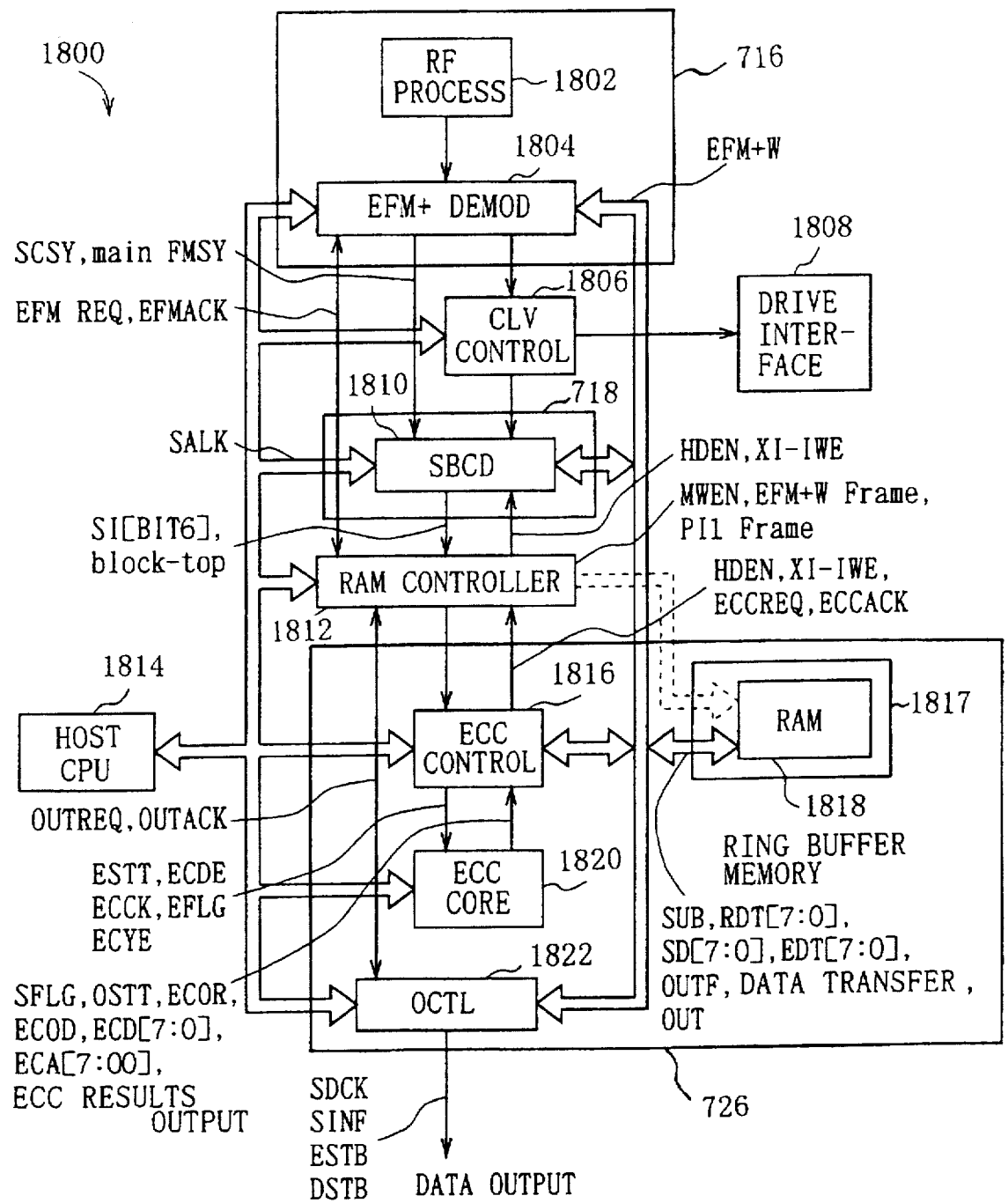
FIG. 18 is a block diagram of a demodulating circuit system according to another embodiment of the present invention.

FIG. 18 illustrates a demodulating apparatus 1800, based upon apparatus 700, which is compatible with the alternative data format described hereinabove. Demodulating apparatus 1800 comprises a demodulator 716, a constant linear velocity (CLV) controller 1806, a drive interface 1808, a sector detector 718, a RAM controller 1812, an error-correction code (ECC) circuit 726, and a host CPU 1814.

Demodulator 716 is a demodulating device which includes an RF processor 1802 and an EFM+ demodulator 1804. RF processor 1802 is a processor device. EFM+ demodulator 1804 is a demodulating circuit for demodulating EFM+ encoded data. CLV controller 1806 is a controller device. Drive interface 1808 is an interface device. Sector detector 718 is a sector detector device which includes a subcode (SBCD) circuit 1810. SBCD 1810 detects sectors in the demodulated signal output by EFM+ demodulator 1804. RAM controller 1812, corresponding to RMIF 908 (FIG. 9), is a controller device for controlling the reading of data from and the writing of data to RAM 1818. Host CPU 1814, corresponding to system controller 732 (FIG. 7) controls each section of apparatus 1800.

ECC 726 is an error-correction code device which includes an ECC controller 1816, a ring buffer memory 1817, an ECC core 1820, and an output control (OCTL) circuit 1822. ECC controller 1816 is a controller device which uses the ECA, ECD, and SFLG supplied from ECC core circuit 1820 to actually correct errors.

Ring buffer memory 1817 is a buffer memory device which includes a RAM 1818. RAM 1818 is a memory device which temporarily stores data when ECC controller 1816 corrects errors. ECC core circuit 1820, corresponding to ECC decoder 904 (FIG. 9), uses Reed-Solomon codes (PI and PO) to generate ECA, ECD, and SFLG, for supply to ECC controller 1816. Output control (OCTL) circuit 1822 executes descrambling, EDCs, and controls the output of data.

In the following description a considerable number of abbreviations are utilized which are defined and described immediately below for the convenience of the reader.

"H": A logic high signal.

"L": A logic low signal.

"block-top": A signal which is H at the beginning of a sector when the SYLK signal is H.

"C11M": A system operation clock that has a frequency of 11.2896 MHz.

"DSTB": A data strobe signal that is H while main data is being output as stream data SD.

"ECA": An error correction address indicating the position (address) of an error.

"ECCK": An operation clock for the ECC core circuit 1820.

"ECD": Error correction data that corrects data when exclusively logically added to erroneous data.

"ECDE": A control signal indicating the end of input data.

"ECOD": This signal is H when the error is found to be uncorrectable.

"ECOR": A strobe signal indicating the output of data with correctable data (ECA, ECD).

"ECYE": A control signal indicating the end of a cycle of input coded data.

"EDT": Data that is read from the RAM 1818 and transferred to ECC controller circuit 1816 for error correction.

"ESTB": An error correction strobe signal that is H during the transfer of the error correction results ER.

"ESTT": A control signal indicating the beginning of input data.

"EFM+W Frame": (EFM+write frame counter) This signal represents a main frame to be written to RAM 1818.

"HDEN": A strobe signal for sector header data.

"main-FMSY": (main frame sync) This signal is H at the main sync (leading sync) of each PI row.

"MWEN": (memory write enable) This signal enables EFM+ demodulated data to be written to RAM 1818.

"MWRQ": (memory write request) This signal indicates a requests to write EFM+ demodulated data to RAM 1818.

"OUTE": An interpolation (output) flag.

"OSTT": (ECC output start) This signal is output an ESTT after 477 ECCKs in a specified code sequence.

"RDT": Data on a read data bus to RAM 1818.

"SALK": (sector address lock) This signal indicates that the sector addresses (IDs) have been detected correctly.

"SAUL": (sector address unlock) A signal that has an opposite polarity to the SALK signal.

"SCSY": (sector sync) This signal becomes H at an SY0 Frame to indicate the beginning of a sector.

"SD": Stream data (decoded output data).

"SDCK": A stream data clock.

"SFLG": A sector flag indicating uncorrectable error for PI1 corrections.

"SINF": A sector information strobe signal that becomes H at the beginning of a sector.

"SUB": Data that is transferred to SBCD circuit 1810 and which includes an ID and an IED.

"SYLK": (sync lock) This signal becomes H when three sync codes have been continuously detected.

"SYUL": (sync unlock) This signal has an opposite polarity to the SYLK signal.

"WDT": Data on a write data bus to RAM 1818.

"XHWE": (Sector header write enable) This signal enables the output of sector information that is to be supplied from SBCD circuit 1810 to RAM 1818.

RF processor 1802 receives an RF signal reproduced by pickup 106 from optical disc 104 (shown in FIG. 7) and converts the RF signal into a binary signal. The binary signal is supplied to EFM+ demodulator 1804. EFM+ demodulator 1804 applies EFM+ demodulation to the binary signal and detects a synchronization pattern in the signal. Based on the synchronization pattern supplied from EFM+ demodulator 1804, CLV controller 1806 controls a drive interface ("drive IF") 1808 to allow a rough adjustment of the optical disc servomechanism (not shown) to enable detection of sync codes (SY0 to SY7 in FIGS. 22A to 22F) therein and allow a phase locked loop (PLL) phase servomechanism (not shown) to further adjust rotation of optical disc 104.

Figure 19:
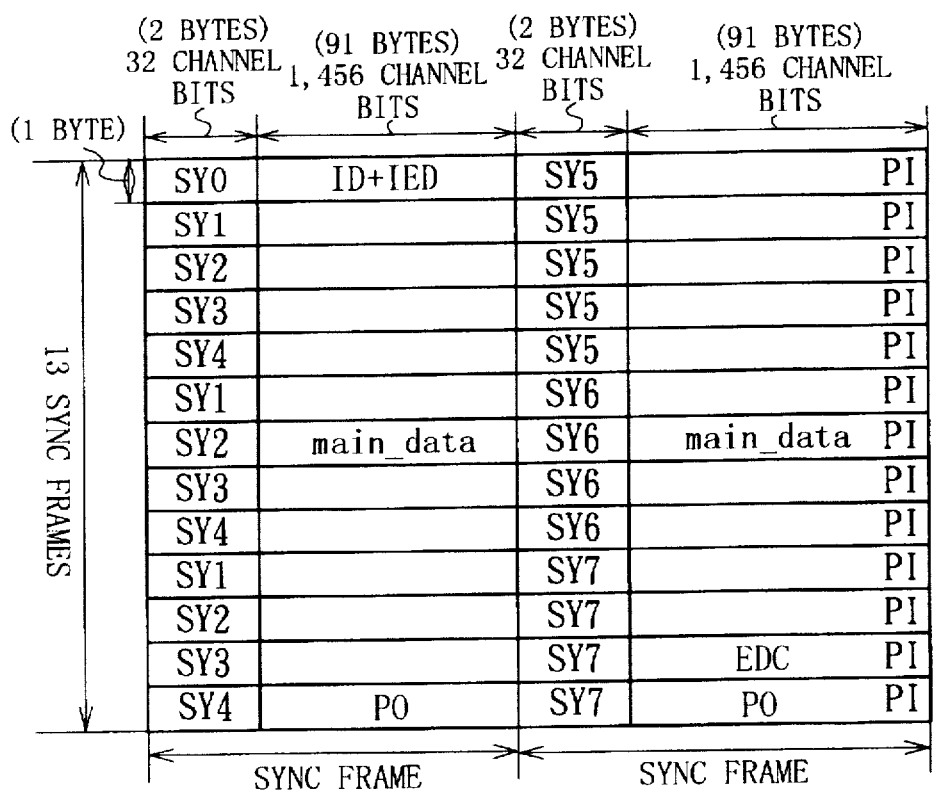
FIG. 19 is a schematic diagram showing the structure of a physical sector.

FIG. 19 shows an example of the structure of a physical sector of optical disc 104. As shown, the physical sector comprises 26 sync frames: two horizontal sync frames and 13 vertical sync frames. Each sync frame consists of 32 channel bits of sync codes (SY0 to SY7) (16 bits (=2 bytes) expressed in data bits prior to modulation) and a data section of 1,456 channel bits (728 bits (=91 bytes) expressed in data bits prior to modulation). The data section of the leading sync frame contains ID information (a sector number), IED information (error-detecting codes for the ID), and main data, e.g., audio and video data.

Preferably, the lower 22 bits of the sync pattern of 32 channel bits is set as "0001000000000000010001", which is defined to be a unique pattern not appearing in the data.

As shown in FIG. 19, the data section of each sync frame on the left side of the diagram has main data recorded thereon, and the data section of the last sync frame on the left side of the diagram has PO (parity) information recorded thereon. The sync frames on the right side of FIG. 19 have main data and PI information recorded thereon, the last but one sync frame on the right side of the diagram has EDC and PI (parity) information recorded thereon, and the last sync frame on the right side of the diagram has PO and PI information recorded thereon.

Figure 20:
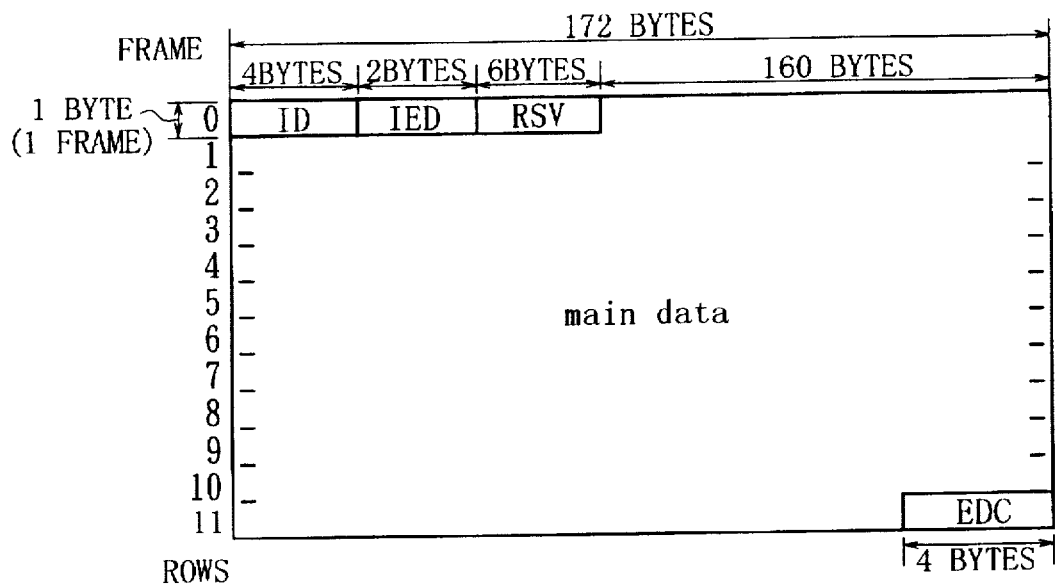
FIG. 20 is a schematic diagram showing the structure of a data sector.

FIG. 20 illustrates in further detail the data in each sector, excluding the PI and PO information. The data in one sector comprises an ID (a sector number) (4 bytes), an IED (error-detecting codes (2 bytes) for the ID), an RSV (a reserved area) (6 bytes), main data, and an EDC (4 bytes). The main data is preferably scrambled.

Sixteen such data sectors are collected, and PO codes of 16 bytes and PI codes of 10 bytes are added to the data sectors as shown in FIG. 15. PO codes are interleaved among the 16 rows so as to be located in each data sector. The data obtained has added thereto frame synchronization (FS) codes expressed by sync codes SYx (x=0, 1, 2, ... 7) as shown in FIG. 17, and is then EFM+ demodulated. This allows the physical sector in the ECC block to consist of 13×2 sync frames as shown in FIG. 19.

Since one ECC block is composed of 16 sectors, the lower 4 bits of the physical sector address is any of 0000 to 1111. As a result, the lower 4 bits of the physical address of the leading sector of the ECC block is 0000.

The main data is preferably scrambled by exclusively logically adding together the main data and scramble data generated using as an initial value a value specified by the lower 4 to 7 bits of the physical sector address.

Figure 21:
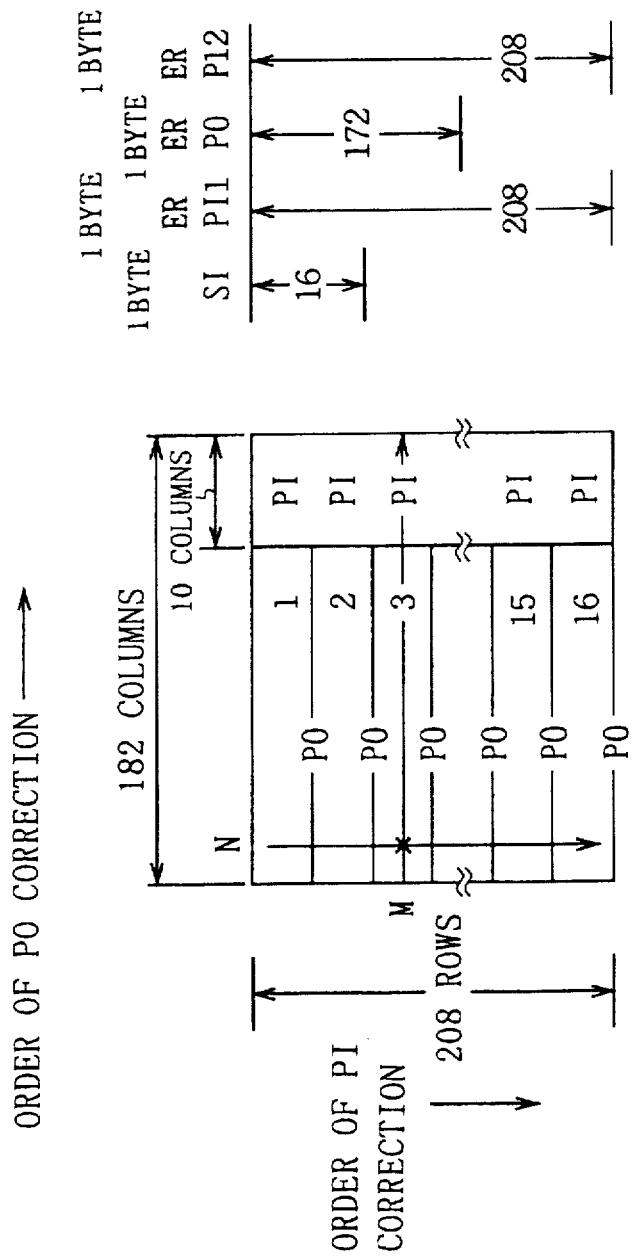
FIG. 21 is a schematic diagram to which reference will be made in explaining the storage of data in a memory.

Data demodulated by EFM+ demodulator 1804 (FIG. 18) is stored in RAM 1818 under the control of RAM controller 1812. FIG. 21 shows one ECC block of data. In reading data stored in the RAM 1818, RAM controller 1812 preferably can obtain desired data by specifying its address by row and column, as shown. For example, data "x" in the N-th byte in the M-th row can be read from the RAM 1818 by specifying two values (M, N).

When the SBCD circuit 1810 recognizes the beginning of a sector of data recorded on optical disc 104 based on the type and continuity of sync codes, data demodulated by EFM+ demodulator 1804 is sequentially stored in RAM 1818 beginning with the leading data. FIGS. 22A to 22F illustrate corresponding signal timing and will be described in detail hereinbelow.

Figure 23:
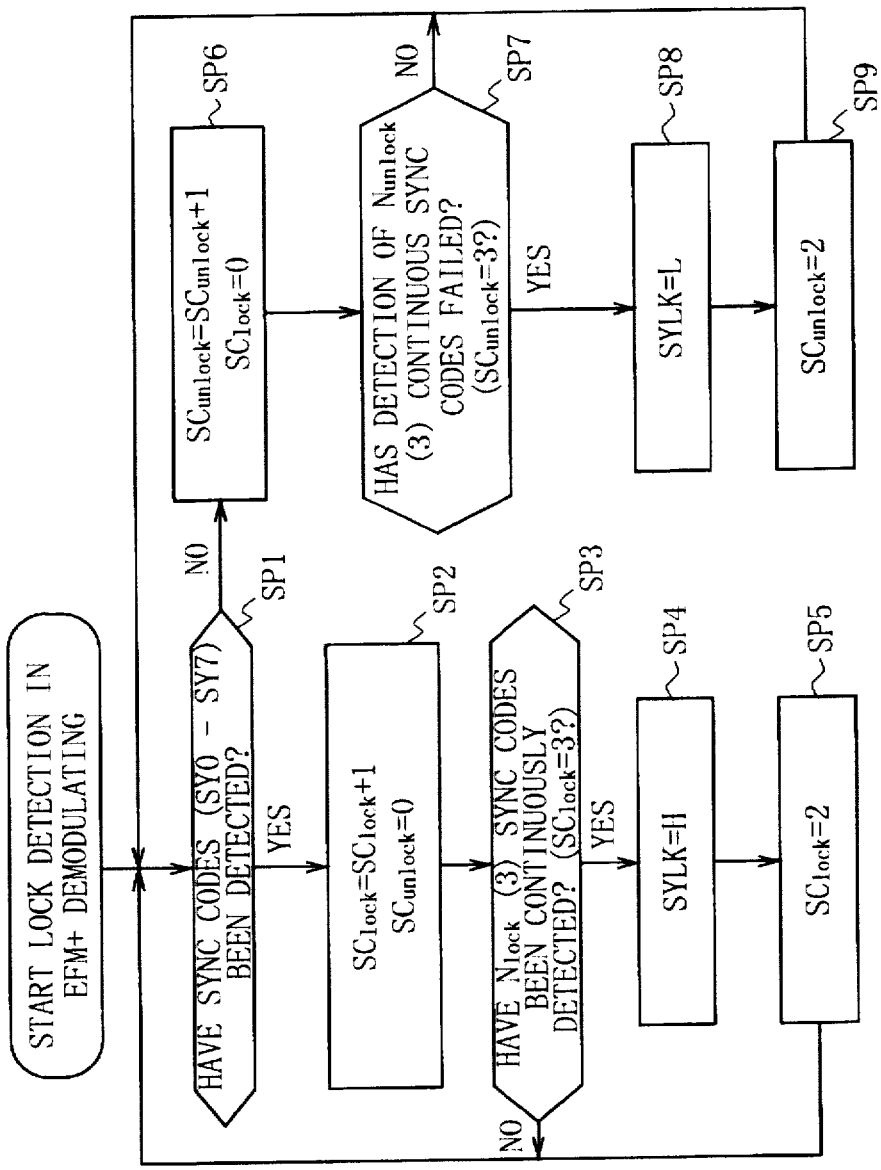
FIG. 23 is a flowchart diagram showing a lock detection process.

FIG. 23 is a flowchart illustrating the process of EFM+ demodulator 1804 detecting a sync lock state. In step SP1, it is determined whether or not the sync codes (SY0 to SY7) shown in FIG. 19 have been detected in each sync frame. If so, the process proceeds to step SP2 to increment a variable SClock by one and to set a variable SCunlock at zero. The variable SClock indicates the number of continuously detected sync codes, and the variable SCunlock indicates the number of continuous failures to detect sync codes.

Next, it is determined in step SP3 whether or not the variable SClock is equal to 3, representing the condition that three sync codes have been continuously detected. If the variable SClock is less than 3, the process returns to step SP1, otherwise processing proceeds with step SP4. In step SP4, it is determined that the sync lock state has been initiated and the SYLK signal is set to H. In step SP5, the variable SClock is set to 2 and processing returns to step SP1 to further determine whether or not three sync codes have been continuously detected.

However, if it is determined in step SP1 that no sync code has been detected, the process proceeds to step SP6. In step SP6, the variable SCunlock is incremented by one and the variable SClock is set at zero. Processing proceeds with step SP7 wherein it is determined whether or not the variable SCunlock is equal to 3, indicating that detection of a sync code has continuously failed three times. If the detection of a sync code has continuously failed twice, the process returns to step SP1. If the detection of a sync code has continuously failed three times, the process proceeds to step SP8 to set the SYLK signal to L.

The process further passes from step SP8 to step SP9 to set the variable SCunlock at 2. If no sync code is detected at the next sync code generation point, the variable SCunlock is set at 2 to hold the SYLK signal to L. The process then returns to step SP1.

In this manner, the EFM+ demodulator 1804 detects sync codes to monitor whether or not sync is locked. Although the above-described embodiment preferably sets the reference number of detection or failure instances at 3, the reference number of continuous detection times NLOCK and the reference number of continuous failure times NUNLOCK can be each set at another value.

Figure 24:
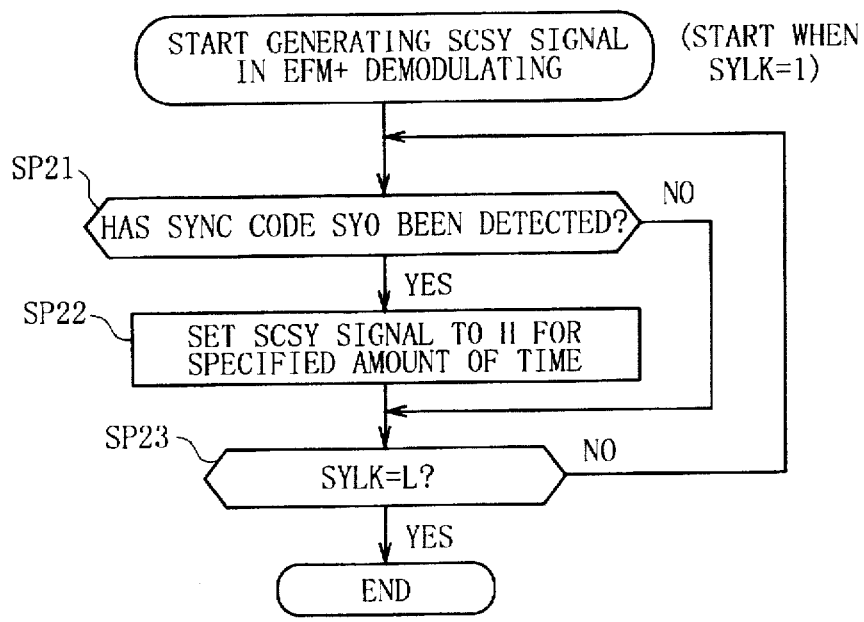
FIG. 24 is a flowchart diagram showing an SCSY signal generation process.

EFM+ demodulator 1804 executes the process shown in the flowchart of FIG. 24 when the SYLK signal becomes H, that is, the lock state is initiated, as described above. It is determined in step SP21 whether or not the sync code SY0 located at the beginning of each sector has been detected. If so, the process passes to step SP22 to set the SCSY signal indicating the beginning of the sector, to H for a specified period of time. The process then proceeds to step SP23 to determine whether the SYLK signal has changed to L, and if not (that is, the signal remains H), the process returns to step SP21 to repeat similar processing. If it is determined in step SP21 that the sync code SY0 has not been detected, processing proceeds with step SP23.

As described above, EFM+ demodulator 1804 generates the SCSY signal at the beginning of each sector as shown in FIG. 22A.

Figure 25:
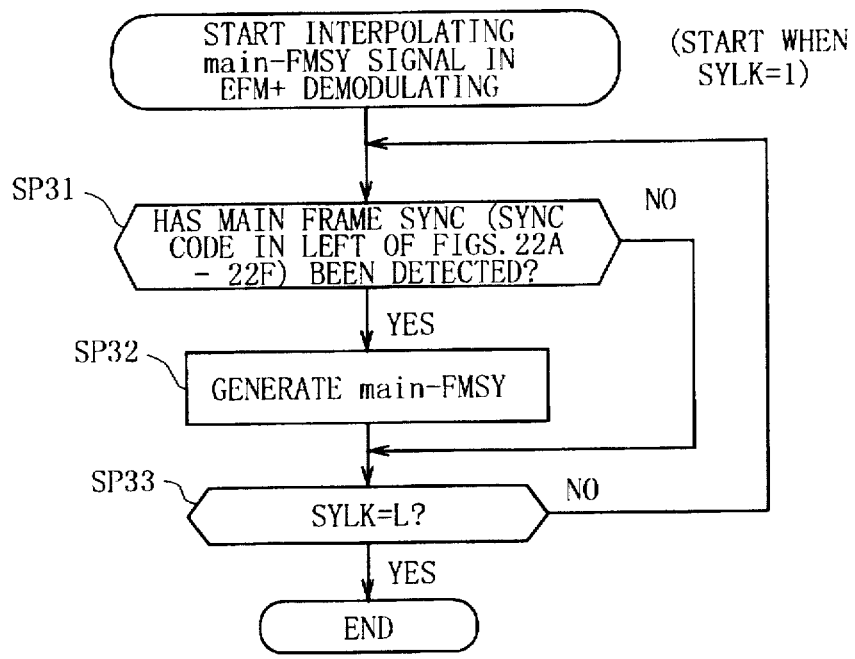
FIG. 25 is a flowchart diagram showing a main-FMSY signal generation process.

Furthermore, when the SYLK signal becomes H, the EFM+ demodulator 1804 carries out the process illustrated in the flowchart in FIG. 25. In step SP31, it is determined whether or not the sync code in the main frame has been detected, where two horizontal sync frames shown in FIG. 19 are collectively referred to as a "main frame". Sync codes which appear on the left side of FIG. 19 are referred to as "main frame syncs". If so, the process passes to step SP32 to cause the EFM+ demodulator 1804 to generate the main-FMSY signal shown in FIG. 22B and processing proceeds with step SP33. If it is determined in step SP31 that no main frame sync has been detected, the processing in step SP32 is skipped and processing proceeds with step SP33.

In step SP33, it is determined whether or not the SYLK signal has changed to L, and if not (that is, the signal remains H), the process returns to step SP31. Otherwise, the generation of the main-FMSY signal is aborted. In this manner, EFM+ demodulator 1804 generates the main-FMSY signal every main frame sync period (the period of two horizontal sync frames in FIG. 19).

When the SCSY signal is input by EFM+ demodulator 1804, RAM controller 1812 sets the MWEN signal to H as shown in FIG. 22D, and allows the writing of the currently detected sector data to RAM 1818. RAM controller 1812 utilizes an EFM+W Frame counter (not shown) to count the main frame shown in FIG. 19. The timing of this operation is shown in FIG. 22E. This count value indicates the ascending main frame numbers shown in FIG. 19, beginning from the top of the main frames.

RAM controller 1812 also utilizes a PI1 Frame counter (not shown) to manage main frame numbers transmitted to RAM 1818. The timing of this operation is shown in FIG. 22F.

When data in the first main frame (numbered 0) shown in FIG. 19, is written to RAM 1818, ECC controller 1816 is supplied with this data in the main frame under the control of RAM controller 1818. ECC controller 1816 transfers the data to ECC core circuit 1820 for error correction. ECC core 1820 executes PI1 processing and correction. Once corrected, the data is written back to RAM 1818.

After PI1 correction (the first processing of PI correction), RAM controller 1812 reads the ID and IED data (SUB) from the data in the main frame numbered 0 stored in RAM 1818 and transfers such data to SBCD circuit 1810 via a data bus according to the timing of the SUB signal numbered 0 in FIG. 22C. The ID and IED data is located only at the beginning of each sector as shown in FIG. 19, so this transfer is executed only from the main frame numbered 0. SBCD circuit 1810 then detects the address (ID) of the corresponding physical sector.

The lower 4 bits of the address of the detected physical sector allows the leading sector of the ECC block to be detected.

FIGS. 26A to 26H are timing charts showing the detection of block-top following the transfer of the ID, and FIGS. 27A to 27H are timing charts showing processing subsequent to the detection of block-top. These timing charts will be explained further in the following.

FIGS. 28A to 28F are timing charts showing the timing for the transfer of the ID. As shown in FIG. 28A, RAM controller 1812 supplies to SBCD circuit 1810 the HDEN signal indicating the timing with which the ID and IED data are read from RAM 1818. The ID data (4 bytes) and IED data (2 bytes) are transferred as read data RDT (FIG. 28C) comprising 8 bits (bits 7–0) from RAM 1818 to SBCD 1810 in synchronism with a clock C11M (FIG. 28F) of a frequency of 11.2896 MHz.

The SFLG signal (=1), which has been supplied to ECC controller 1816 by ECC core 1820, indicates that the ID and IED data has been corrected by the PI1 correction processing (if uncorrectable, the SFLG signal is H). On receiving the ID (the sector address), SBCD circuit 1810 generates sector information SI corresponding to this ID (the sector) according to instructions from host CPU 1814, such as a generation mode for interpolation flags, a start sector, and an end sector. For example, for the sector with the ID specified by the host CPU 1814 as data to be output, sector information bit 5 is set to 1, and bit 4 is set to 0.

FIG. 29 shows the structure of the sector information (SI). As shown in this figure, each bit of the sector information SI represents the following information:

Bit 7: Setting of an interpolation flag (OUTF) generation mode (1: Interpolation flag generation mode)

Bit 6: Leading sector of an ECC block (1 when the lower 4 bits of a physical sector address are 0) (1: Leading sector)

Bit 5: Start sector (1 when a physical sector address matches a start sector address specified by the host CPU 40) (1: Start sector)

Bit 4: End sector (1 when a physical sector address matches an end sector address specified by the host CPU 40) (1: End sector)

Bit 3: Bit 3 of a descramble initialization address (the seventh bit of a physical sector address)

Bit 2: Bit 2 of a descramble initialization address (the sixth bit of a physical sector address)

Bit 1: Bit 1 of a descramble initialization address (the fifth bit of a physical sector address)

Bit 0: Bit 0 of a descramble initialization address (the fourth bit of a physical sector address)

Figure 30:
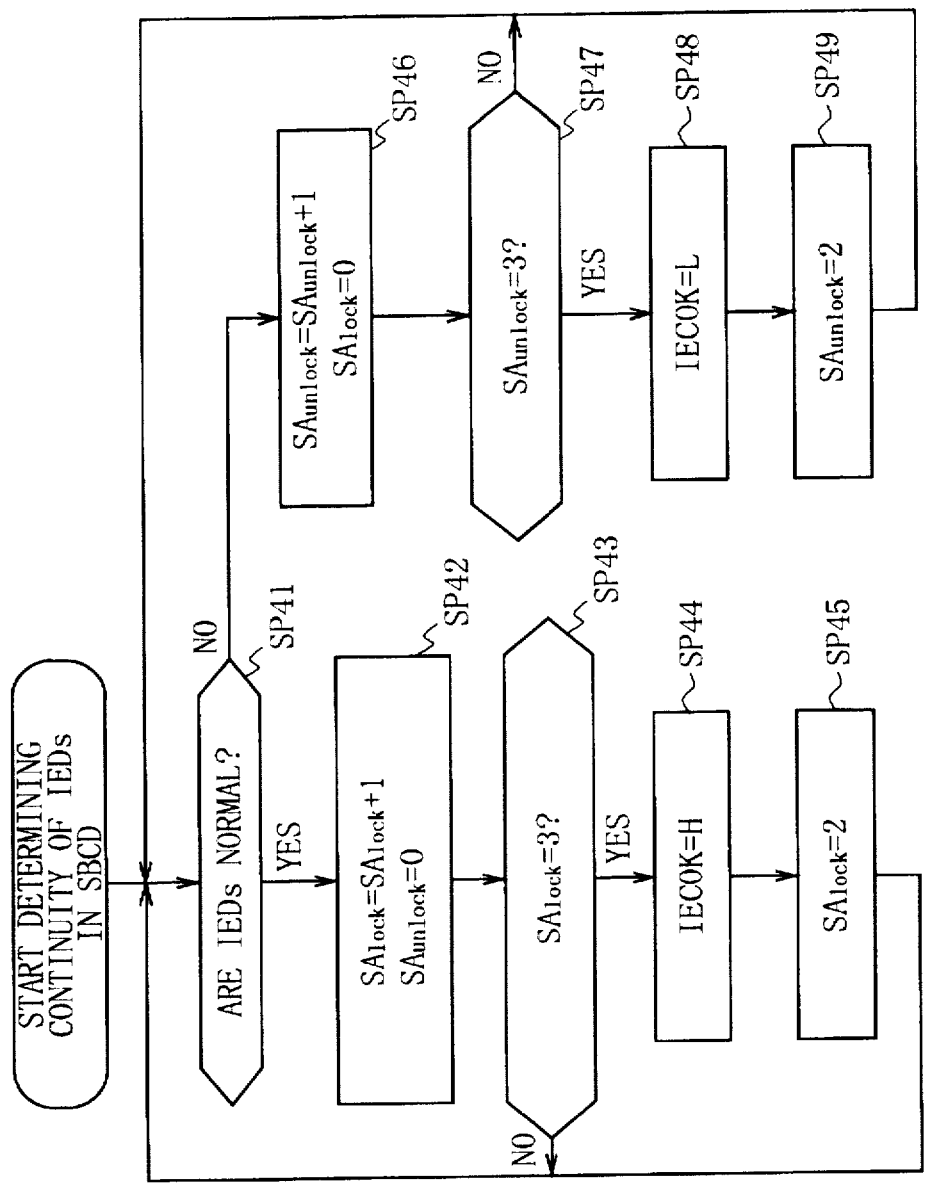
FIG. 30 is a flowchart diagram showing an IED continuity detection and determination process.
Figure 31:
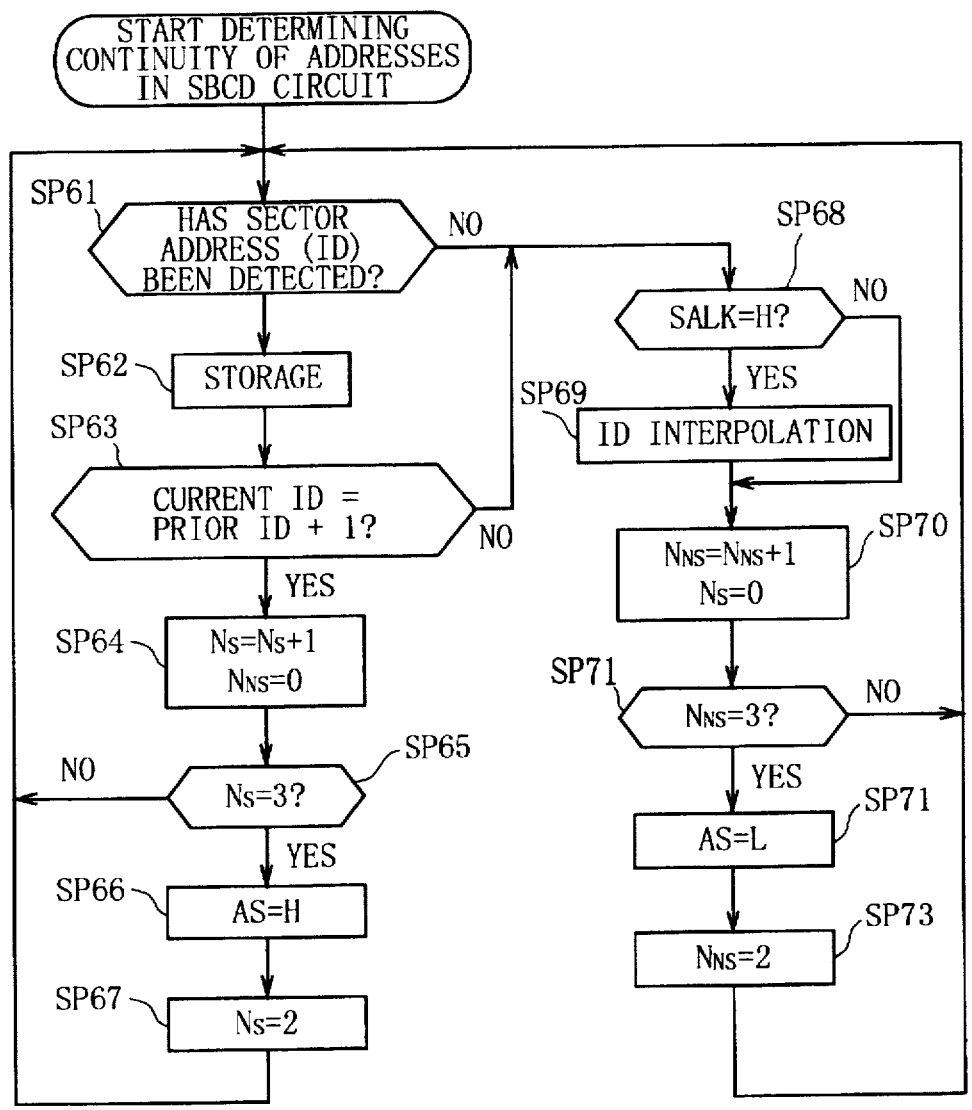
FIG. 31 is a flowchart diagram showing an ID (address) continuity determination process.

After the ID of 4 bytes and the IED of 2 bytes have been used for checking as described below with reference to FIGS. 30 to 32, the XHWE signal shown in FIG. 28D is set to L by ECC controller 1816. Sector information SI is transferred and written from SBCD circuit 1810 to RAM 1818 as write data WDT of 8 bits. The sector information for 16 sectors is stored so as to correspond to the 16 PI rows located above, as shown in FIG. 21. Thus, by specifying the number of a specified PI row, the corresponding sector information can be obtained.

A description of the process by which SBCD circuit 1810 checks the ID and IED is described with reference to the flowcharts shown in FIGS. 30 to 32. SBCD circuit 1810 carries out the processing shown in the flowchart of FIG. 30 to determine whether or not there are N, in this embodiment preferably 3, continuous sectors which are determined to have normal IED check results, e.g., there are no errors in the ID.

In step SP41, it is determined whether the IED check obtained is normal. If so, the process proceeds to step SP42 to increment by one a variable SAlock indicating the number of sectors with a normal ID. Variable SAunlock, indicating the number of continuous sectors with an abnormal ID, e.g., that there is an error in the ID, is set to zero.

Following step SP42, processing proceeds with step SP43 to determine whether or not the variable SAlock is equal to 3. If the variable SAlock, which has been incremented in step SP42, is determined not to be equal to 3, the process returns to step SP41. If the variable SAlock is determined to be equal to 3, that is, three sectors with a normal ID have been continuously reproduced, the process passes to step SP44 to set a flag IECOK to H. Following step SP44, in step SP45, the variable SAlock is set at 2 and processing returns to step SP41 to detect the number of continuous normal results from subsequent IED checks.

If the IED is determined to be abnormal in step SP41, the process passes to step SP46 to increment the variable SAunlock by one and to set the variable SAlock at zero. It is then determined in step SP47 whether or not the variable SAunlock is equal to 3 and, if not, the process returns to step SP41.

If the variable SAunlock is determined to be equal to 3 in step SP47, that is, three sectors with an abnormal IED check result have been continuously detected, the process proceeds with step SP48 in which the flag IECOK is set to L. In the subsequent step SP49, if a following IED check produces an abnormal result, the variable SAunlock is set at 2 and processing returns to step SP41 to detect three continuous sectors with an abnormal IED check result.

As described above, SBCD circuit 1810 sets the flag IECOK to H if three or more continuous IED checks produce a normal result, while it sets the flag IECOK to L if three or more continuous IED checks produce an abnormal result. SBCD circuit 1810 further executes the processing shown in FIG. 31 to determine the continuity of the IDs (the addresses). The IDs of the sectors in one ECC block preferably should be sequentially incremented.

First, it is determined in step SP61 whether or not an ID (a sector address) has been detected. If so, the process proceeds to step SP62 to store the ID for comparison with a subsequent ID. In the following step SP63 it is determined whether or not the current ID is larger than the last detected and stored ID by one. If so, the process proceeds to step SP64 to increment by one a variable NS indicating that correct IDs have been continuously detected. Variable NNS, indicating that no ID has been detected or that detected IDs are not continuous, is set to zero.

Following step SP64, in step SP65, it is determined whether or not the variable NS is equal to 3 and, if not (that is, the detection of three continuous IDs each incremented by one has failed), the process returns to step SP61. If the variable NS is determined to be equal to 3, the process passes to step SP66 to set to H a flag AS indicating that continuous IDs are in normal condition. f the subsequent ID is detected in step SP67, the variable NS is set at 2 and processing returns to step SP61 to further detect that three continuous correct IDs have been detected.

If no ID has been detected in step SP61 or if the currently detected ID is not larger than the prior ID by one (the IDs are determined not to be continuous) in step SP63, the process proceeds with step SP68 to determine whether or not the flag SALK is H. The flag SALK is described below with reference to FIG. 32, and set to H when three or more continuous IED checks produce a normal result and when the continuity of three or more IDs are retained.

If the flag SALK is determined to be set to H in step SP68, the process proceeds to step SP69 to interpolate the IDs. Since no ID has been detected or the detected IDs are not continuous, 1 is added to the prior ID to generate a new ID, which is used instead of the detected ID. Following step SP69, processing proceeds with step SP70. If the flag SALK is detected as L in step SP68, processing proceeds with step SP70.

In step SP70, the variable NNS is incremented by one and the variable NS is set at zero. It is determined in step SP71 whether or not the variable NNS is equal to 3 and, if not, the process returns to step SP61. If, however, the variable NNS is determined to be equal to 3, the process passes to step SP72 where the flag AS is set to L. If the subsequent ID is not detected in step SP73, the process sets the variable NNS at 2 and returns to step SP61 to further detect three continuous failures to detect IDs.

As described above, SBCD circuit 1810 sets the flag AS to H when the IDs are continuous, whereas it sets this flag to L when the IDs are not continuous. SBCD circuit 134 uses the two flags IECOK and AS generated in the above manner in order to generate the flag SALK.

As shown in the flowchart of FIG. 32, in step SP81 in it is determined whether or not the flag IECOK is H and, if so, the process proceeds to step SP82 to determine whether or not the flag AS is H. If it is determined in step SP82 that the flag AS is H, the process passes to step SP83 where the flag ASLK is set to H.

If the flag IECOK is determined to be L in step SP81 or the flag AS is determined to be L in step SP82, the process passes to step SP84 where the flag SALK is set to L.

As described above, SBCD circuit 1830 sets the flag SALK to H if three or more continuous IEDs are normal and if three or more continuous IDs are each incremented by one. The flag SALK is set to L if three or more continuous IEDs are abnormal or if the detection of three continuous IDs has failed.

Host CPU 1814 detects the access position of pickup 106 on optical disc 104 by referencing the state of the SALK flag and the ID data described above.

The results of PI1 corrections can be added to the condition for SAlock or SAunlock shown in FIGS. 33A to 33D. Furthermore, although the reference number for SAlock or SAunlock is preferably set at 3, it may be set at a different value by host CPU 1814.

If SYLK becomes L (SYUL=H) when SALK=L (SALK= H), both the writing of EFM+ demodulated data by the EFM+ demodulator 1804 to RAM 1818 and ECC controller 1816 are reset. The unlock state is subsequently canceled (SAUL=L) and SYLK becomes H. A write of EFM+ demodulated data is then resumed to RAM 1818.

Unlock can be compulsorily executed by host CPU 1814. For example, host CPU 1814 can initiate the unlock state after a track jump in order to reset ECC controller 1816. The unlock state can be canceled either by host CPU 1814 or simply automatically without instruction by host CPU 1814.

If SYLK=H (locked state) and bit 6 of the sector information is 1, indicating the beginning of the sector, SBCD circuit 1810 holds block-top to H until SYLK becomes L, indicating the lock is released, as is shown in FIGS. 26A to 26H. If block-top=L, the value of EFM+W frame changes from 12 to zero once both SCSY and main-FMSY have become H, indicating the beginning of the sector. The value of EFM+W frame repeatedly changes from 0 up to 12 for each main frame.

If, however, block-top=H, the value of EFM+W frame continues to be incremented even after it has reached 13, as shown in FIGS. 27A to 27H. As a result, the data in the main frames of each ECC block is sequentially stored in different addresses of RAM 1818, as shown in FIG. 21.

The EFM+-demodulated data is subsequently and similarly written to RAM 1818 while PI1 corrections are carried out. Once the PI1 correction of the data in one ECC block (208 rows of data) has been finished, ECC processing in the direction of PO columns is executed (PO corrections).

To read data in the direction of the PO columns, the PO rows must be deinterleaved (FIG. 16). Thus, if the column corresponding to the N-th byte shown in FIG. 21 is read, the data in this column is read downward while the interleaved PO rows are being skipped, and the codes in only the PO rows in the same column corresponding to the N-th byte are read and supplied to ECC core circuit 1820.

Once ECC core circuit 1820 has finished the PO correction (all the columns except the (10) PI columns at the right side of FIG. 21, that is, 172 columns, have been processed), PI2 corrections (the second processing of PI corrections) are carried out. ECC processing in the direction of the PI rows is executed twice in order to improve the error correction performance.

In the PO correction, erasure corrections are carried out depending on an error flag (a PI1 flag) generated on the basis of the results of the PI1 correction. In PI2 corrections, erasure corrections are also carried out using an error flag (a PO flag) generated on the basis of the results of the PO correction. These erasure corrections are executed to improve the error correction performance as described above.

The PI sequence of data, for which the PI2 correction has been finished, is transferred from RAM 1818 to OCTL circuit 1822, in which the main data is descrambled for each sector using bits 3 to 0 of the sector information shown in FIG. 29. In addition, OCTL circuit 1822 executes EDC-related calculations. Based on the results of these calculations and the presence of an error flag added to the main data, it is determined whether or not there is any error in the desired sector. Based on this determination, host CPU 1814 determines whether or not data should be read again from optical disc 104. If so, host CPU 1814 attempts again to access optical disc 104. Otherwise, the data in the sector containing errors is output to multiplex data separator 704 (FIG. 7).

The ECC core circuit 1820 preferably comprises general Reed-Solomon code error correction LSIs for which the code length, the number of parities, and the correction mode (normal correction or both normal and erasure corrections) can be programmed. ECC core 1820 also preferably enables multi-coded and continuously coded data (a plurality of code sequences of difference code lengths) to be decoded in real time. Reed-Solomon code error correction LSIs include, for example, CXD307-111G commercially available from SONY (trademark), and an application specific integrated circuit (ASIC) formed using these LSIs may serve as an ECC core. Such an ECC core optionally may be incorporated into ECC core circuit 1820 shown in FIG. 21.

FIGS. 33A to 33D show the timing of signals during an error correction operation. In this figure, ESTT (FIG. 33A) is a control signal indicating the beginning of the codes (the PI or PO row), and ECDE (FIG. 33B) is a control signal indicating the end of the codes (the PI or PO row). ECYE (FIG. 33C) is a control signal indicating the end of a code (the PI or PO row) cycle. These signals are supplied from RAM controller 1812 via ECC controller 1816 to ECC core circuit 1820. ECC core circuit 1820 uses these control signals to identify data supplied from RAM 1818.

As shown in FIGS. 33A to 33D, PI codes are transferred during 182 ECCKs between ESTT and EDCE. PO codes are also transferred during 208 ECCKs between ESTT and ECDE.

If the code in the PI row and the code in the PO column have different code lengths, data to be corrected (EDT) and the error flags for erasure corrections (the PI1, PI2, and PO flags) can be input with the same timing regardless of the code sequence, as shown in FIGS. 33A to 33D, by adapting the code cycle length to the longer of the PI row and PO column code lengths (in this embodiment, 208 of the PO column code). Values can be set for parameters such as the code length and the number of parities. A setting may be changed by supplying a new setting data to ECC core circuit 1820 to allow this circuit to automatically change its internal setting based on the supplied data when ESTT becomes H.

The results of data corrections are output using a 477 ECCK cycle as shown by the following equation:

$$\text{throughout} = 2 \times NCYC + 3 \times PCYC + 13 \quad (5)$$
$$= 2 \times 208 + 3 \times 16 + 13 = 477(ECCK)$$

In the above equation, NCYC represents the longer of the PI row and the PO column code lengths, and PCYC represents the larger number of parities. As shown in FIGS. 36A to 36E, OSTT (FIG. 33D) is output from ECC core circuit 1820 to ECC controller 1816 later than the timing of ESTT (FIG. 33A) by the time required for a data output cycle (when the results of corrections are output). In this embodiment, OSTT is delayed 477 ECCKs relative to ESTT.

If error detection has been executed and a detected error is found to be correctable, ECC core circuit 1820 outputs O.CODEERR (FIG. 34G)=L to ECC controller 1816 when OSTT (FIG. 34E) becomes H. Then, 8 bit data indicating an error pattern (data to which the erroneous data is exclusively logically added to obtain correct data) ECD[7:0] (FIG. 34H) and an error position (8 bit data indicating a position (an address) in which the error is occurring) ECA[7:0] (FIG. 34I) are output when ECOR (FIG. 34F) is H.

In the erasure correction mode, the error position ECA[7:0] data corresponding to the position to which an error flag EFLG (FIG. 34C) is input is ensured to be output, but if the data in that position is correct, then the error pattern ECD[7:0]=00.

If the error is uncorrectable, OSTT (FIG. 34E) switches to H, O.CODEERR (FIG. 34G) simultaneously switches to H, and ECOR (FIG. 34F) is subsequently prevented from becoming H (not shown in this timing chart). In addition, the output of O.CODEERR (FIG. 34G) is latched until OSTT (FIG. 34E) changes to H again, while ECOR (FIG. 34F), ECD[7:0] (FIG. 34H), and ECA[7:0] (FIG. 34I) continue to be output until OSTT (FIG. 34E) changes to H again.

FIGS. 35A–E, 36A–E, and 37A–E are timing charts showing control provided during ECC processing. PI1-R, PO-R, and PI2-R shown in FIGS. 35B, 36B, and 37B each indicate the timing with which PI1 (the first processing of PI correction), PO (PO correction), and PI2 (the second processing of PI correction) sequences of data EDT[7:0] and EFLG (FIG. 34C) for which errors will be corrected are transferred from RAM 1818 via ECC controller 1816 circuit 136 to ECC core circuit 1820.

As shown in FIGS. 35A, 36A, and 37A, the MWRQ signal is supplied 182 times to write the data EFM+W (182 bytes of data) in one PI row from EFM+ demodulator 1804 to RAM 1818, so the EFM+ demodulated data in one PI row is written to RAM 1818. While the data in one PI row is being written, the data in an ECC block which has already been written to RAM 1818 is read and transferred to ECC core circuit 1820 via ECC controller 1816. That is, while the data in one PI row is being written to RAM 1818 at a low speed, the data in another PI row or a PO column which is already written is read three times at a high speed. If the data in the PI row at the beginning of the sector is transferred, the subcode data (the ID and IED) is also read. The write and read are carried out such that while one is executed, the other is suspended.

If, for example, the PI1 correction of an ECC block is executed, the data in one PI row is read during the period of time in which a write of the data in one PI row is executed. The data in one PI row is read from RAM 1818 and transferred to ECC core circuit 1820 via the ECC controller 1816. Although in FIGS. 35B, 36B, and 37B 208 ECCKs are used to read the data PI1-R for the PI1 correction, this number of ECCKs is adapted to the length of the PO column which is the longest data length, and only 182 ECCKs are actually used for data transfer in order to transfer the data in PI row.

Figure 38:
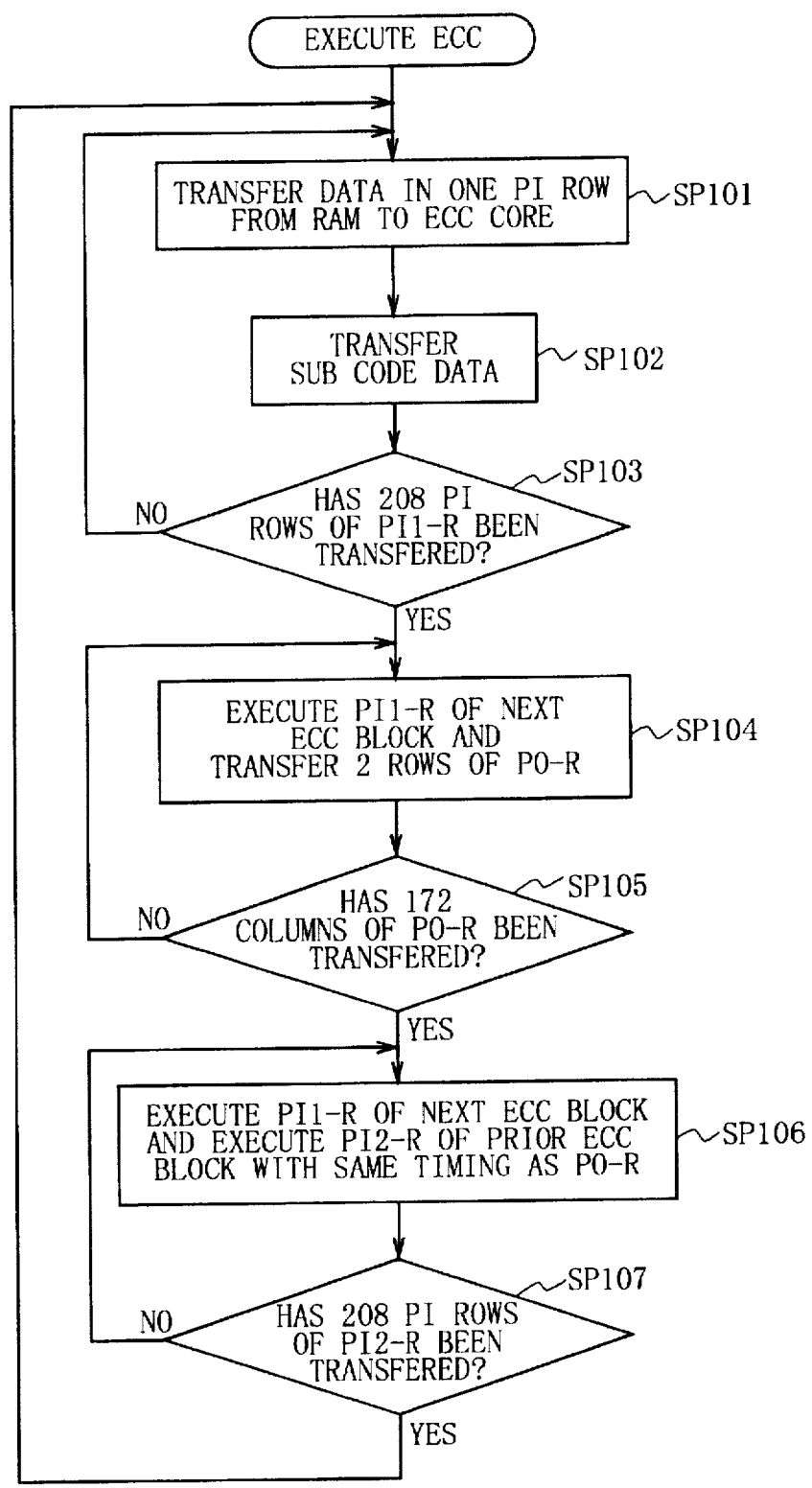
FIG. 38 is a flowchart diagram showing an ECC processing process.

FIG. 38 is a flow chart illustrating a procedure used by RAM controller 1812 to write and read data to and from RAM 1818 in order to execute ECC corrections. In step SP101, RAM controller 1812 transfers the data in one PI row from RAM 1818 to ECC core circuit 1820. In this embodiment, PI codes (a parity) and PO codes (a parity) are added to each ECC block. Until the correction and write-back of the first PI sequence of data from a first ECC block has been finished, the PO sequence of data PO-R or the PI2 sequence of read data PI2-R from the same ECC block cannot be transferred. In this case, no data is transferred during the subsequent 2×208 ECCKs. If there is subcode data (SUB) following the above data, it is transferred in step SP102. Thus, RAM controller 1812 sequentially transfers the data in one PI row of the first ECC block and, when required, the subcode data.

In step SP103 it is determined whether or not the PI1-R data in 208 rows of the first ECC block has been transferred and, therefore, whether the transfer of all the data in 208 PI rows of the first ECC block has been completed. If not, processing returns to step SP101; otherwise, processing proceeds with step SP104.

In step SP104 RAM controller 1812 initiates the transfer of PI1-R from a second ECC block following the first ECC block and of PO-R from the first ECC block during the subsequent 182 MWRQS. That is, during the subsequent 182 MWRQs PI1-R from the second ECC block following the first ECC block is first transferred, and PO-R from the first ECC block is then transferred twice (the PO data in two columns is transferred).

These operations are performed during each period of 182 MWRQs. Once the PO data in 172 columns of the first ECC block has been transferred, RAM controller 1812 obtains an affirmative result in step SP105 and transfers the PI2 sequence of data PI2-R from the first ECC block in the subsequent step SP106. The data PI2-R is transferred with the same timing with which the data PO-R of the first ECC block shown in FIG. 36B is transferred. At this time, the data PI1-R belongs to the next ECC block (the second ECC block). The PI2-R in 208 PI rows of the first ECC block is transferred in this manner, and when the processing of the PI1-R, PO-R, and PI2-R of the first ECC block is finished, RAM controller 1812 obtains an affirmative result in step SP107 and processing returns to step SP101 to continue processing the next ECC block.

ECCK (FIG. 34A) is output from RAM controller 1812 to ECC core circuit 1820 only during data transfer. In addition, the results of the correction of transferred data are output 477 clocks (ECCK) after their input, as described above. Thus, the results of the determination of whether a sequence of data contains an error (FIGS. 35C, 36C, and 37C) are output when the next but two from this sequence is transferred (FIGS. 35B, 36B, and 37B). This output is stored in an ERR FIFO circuit 3904 (FIG. 39) described below.

When data to be error-corrected is input from RAM 1818 to ECC controller 1816 as described above, the controller 1816 executes the PI1 correction of the data in one PI row and outputs the results 477 ECCKs later (FIGS. 35C, 36C, and 37C). The results are transferred to and temporarily stored in ERR FIFO 3904 used as a buffer for ECC controller 1816 described below. This data is further read from ERR FIFO 3904, transferred back to RAM 1818 as data for which error corrections have been completed, and written thereto as data PI1-W as shown in FIGS. 36D and 37D. Data for which the PO or PI2 correction has been completed is also written to RAM 1818 as data PO-W or PI2-W, respectively.

The data for which error corrections have been completed is further read for each PI row using a period of 182 SDCKs and output from OCTL circuit 1822, as shown in FIGS. 35E, 36E, and 37E.

Figure 39:
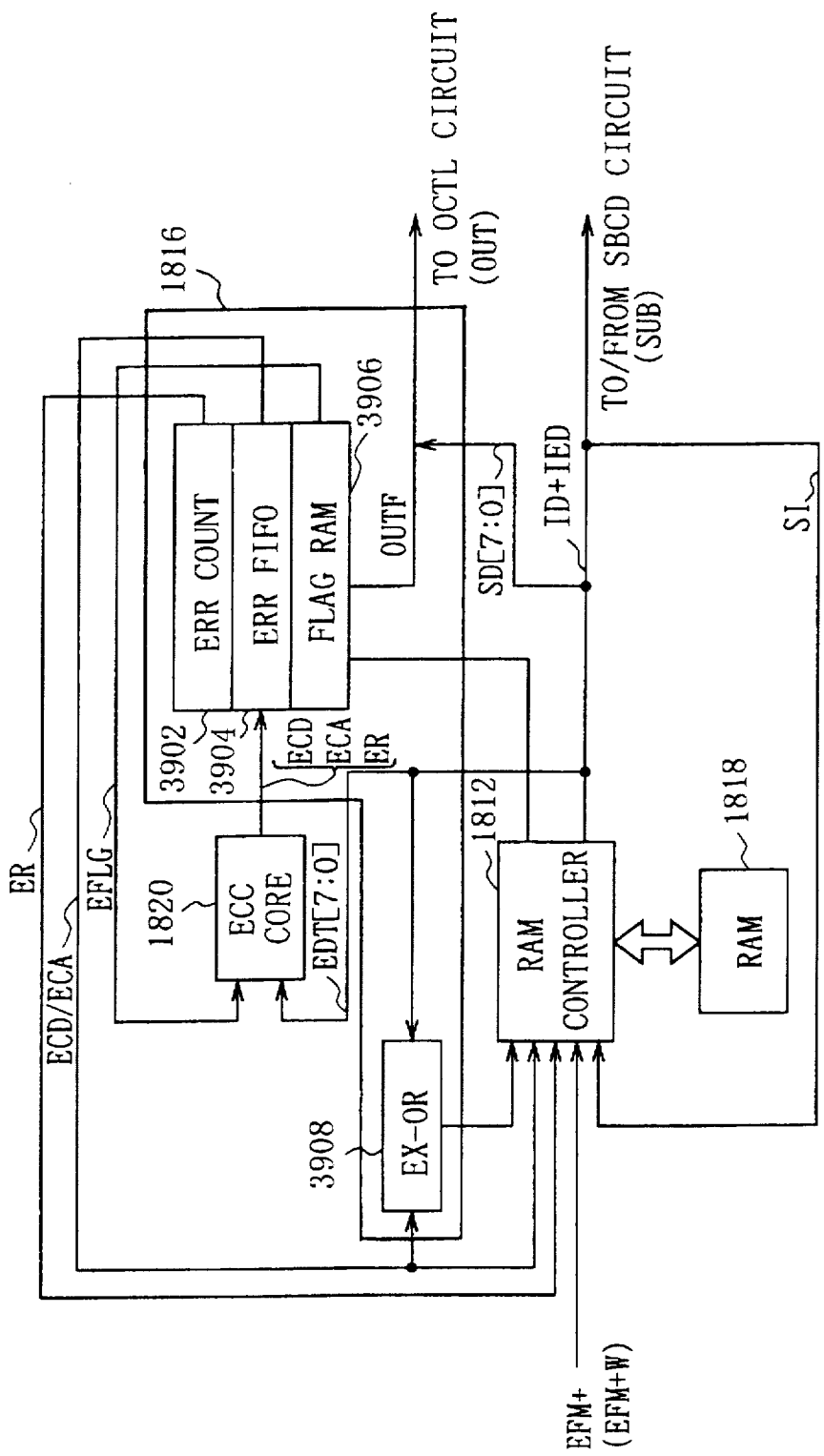
FIG. 39 is a block diagram of an error correction circuit system according to another embodiment of the present invention.

FIG. 39, in which the same components as in FIG. 18 are provided with the same reference numerals, is a block diagram illustrating a preferred flow of signals during error correction processing. ECC controller 1816 preferably comprises a memory device (ERR COUNT) 3902, another memory device (ERR FIFO) 3904, a flag memory (FLAG RAM) 3906, and a logical summing (EX-OR) circuit 3908.

Error memory device 3904 is a memory device having a first-in-first-out data storage capability. Flag memory 3906 is another memory device. Logical summing circuit 3908 is a device for exclusively logically summing two quantities.

Demodulated data output from the EFM+ demodulator 1804 is written to RAM 1818 under the control of RAM controller 1812. The SUB data (the ID and IED) stored at the beginning of each sector is read from RAM 1818 and transferred to SBCD circuit 1810. SBCD circuit 1810 generates sector information SI as shown in FIG. 29. The sector information SI is transferred from SBCD circuit 1810 and written to RAM 1818.

RAM controller 1812 supplies the data in one PI row which is written to RAM 1818 to ECC core circuit 1820 via ECC controller 1816 (in FIG. 39, EDT data is shown directly supplied to the ECC core circuit 1820 for convenience of illustration) as error correction data EDT comprising groups of 8 bits. When the data in one PI row is supplied to ECC core circuit 1820, the circuit 1820 uses the PI codes to generate 8 bits of error correction data ECD (FIG. 34H) and 8 bits of an error correction address ECA (FIG. 34I). The error correction data ECD and the error correction address ECA are transferred and written from ECC core circuit 1820 to ERR FIFO 3904.

To actually correct the error, RAM controller 1812 reads the data EDT in that PI row and supplies it to the EX-OR circuit 3908. EX-OR circuit 3908 is supplied with the error correction data ECD and the error correction address ECA from ERR FIFO 3904. EX-OR circuit 3908 corrects the error by exclusively logically adding together the error correction data ECD and the data EDT read from RAM controller 1812 at the bit specified by the error correction address ECA. The error corrected data is written back to RAM 1818 via RAM controller 1812.

In addition, ECC core circuit 1820 produces from the ECD and ECA an error correction result ER comprising 8 bit data as shown in FIG. 40, and supplies result ER to ERR COUNT 3902 for storage. The error correction result ER of one byte is written to RAM 1818 via RAM controller 1812 so as to correspond to that PI row as shown in FIG. 21.

The 8 bit data of the error correction result ER shown in FIG. 40 represents the following information:

Bit 7: Error uncorrectable (0: Correctable, 1: Uncorrectable) (1 if the errors in the series are found to be uncorrectable)

Bit 6: PO (0: PI, 1: PO) (indicates series is from a PI row or a PO column)

Bit 5: PI2 (0: PI1, 1: PI2) (indicates series is a PI1 or a PI2 series)

Bit 4: The number of corrections (the value of the fifth bit (MSB) of the number of error corrections)

Bit 3: The number of corrections (the value of the fourth bit of the four bits indicating the number of error corrections)

Bit 2: The number of corrections (the value of the third bit of the four bits indicating the number of error corrections)

Bit 1: The number of corrections (the value of the second bit of the four bits indicating the number of error corrections)

Bit 0: The number of corrections (the value of the first bit of the four bits indicating the number of error corrections)

The error flag (the PI1 flag and bit 7 of the error correction result ER), indicating whether or not the data has been corrected by PI1 correction processing, is stored in ERR COUNT 3902 as part of the error correction results ER and in FLAG RAM 3906C.

Such a PI1 correction processing is executed for the 208 PI rows shown in FIG. 21.

RAM controller 1812 reads the 208 bytes of data in the first PO column from RAM 1818 and supplies such data to ECC core circuit 1820 via ECC controller 1816 as the EDT. The PI1 flag that has been written to FLAG RAM 3906 is also retrieved and supplied to ECC core circuit 1820. ECC core circuit 1820 uses the pattern PO and the PI1 flag to generate an ECD and an ECA for normal correction or erasure correction. The ECD and ECA are supplied from ECC core circuit 1820 to ERR FIFO 3904 and stored therein. The error correction results ER for this PO column which are generated by ECC core circuit 1820 on the basis of the ECD and ECA are also transferred to and stored in ERR COUNT 3902. The PO flag corresponding to bit 7 of the error correction results ER is also written to FLAG RAM 3906.

This data EDT in the PO column which has been read from RAM 1818 is supplied to EX-OR circuit 3908. EX-OR circuit 3908 is also supplied with the ECD and ECA from ERR FIFO 3904. EX-OR circuit 3908 corrects the error by exclusively logically adding the ECD and EDT together so as to correspond to the bits of the address specified by the ECA. The error corrected data is written back to RAM 1818.

In addition, the error correction results ER for this PO column are read from ERR COUNT 3902 and written to RAM 1818. The error correction results ER for this PO column are sequentially written to the positions corresponding to the 172 PI rows (beginning from the top).

Such a PO correction is executed for the 172 PO columns.

If, after the PI1 and PO correction processings, a PI2 correction processing is carried out, the data in the first PI row is read from RAM 1818 as the EDT and supplied to ECC core circuit 1820. The PO flag that has been written to FLAG RAM 3906 is also read and supplied to ECC core circuit 1820. ECC core circuit 1820 uses this PO flag and the parity PI to generate an ECD and an ECA and supplies both to ERR FIFO 3904.

The ECD and ECA which have been written to ERR FIFO 3904 and the data in the PI column supplied to EX-OR circuit 3908 and read from RAM 1818 are exclusively logically added together to correct the error. The data, for which the error has been corrected, is written by EX-OR circuit 3908 via RAM controller 1812 to RAM 1818.

ECC core circuit 1820 also produces error correction results ER from the ECD and ECA and supplies them to ERR COUNT 3902 for storage. The PI2 flag corresponding to bit 7 is also written to FLAG RAM 3906.

The error correction results ER for the PI2 row which have been written to ERR COUNT 3902 are read therefrom and written to RAM 1818. The error correction results ER for the PI2 row are written to the positions each corresponding to each of the 208 PI rows of an ECC block.

FIGS. 41A to 41G are timing charts showing bus arbitration for accesses to RAM 1818. In this figure, EFMREG (FIG. 41A) is a signal output to RAM controller 1812 by EFM+ demodulator 1804 to request a write of EFM+ demodulated data to RAM 1818. OUTREQ (FIG. 41B) is a signal output to RAM controller 1812 by OCTL circuit 1822 to request a read of ECC-processed data from RAM 1818. ECCREQ (FIG. 41C) is a signal output to RAM controller 1812 by ECC controller 1816 to access RAM 1818 in order to transfer data to ECC core circuit 1820 to allow it to correct errors or in order to obtain error-corrected data, or to request a SUB transfer (an ID and an IED) from SBCD circuit 1810.

Figure 44:
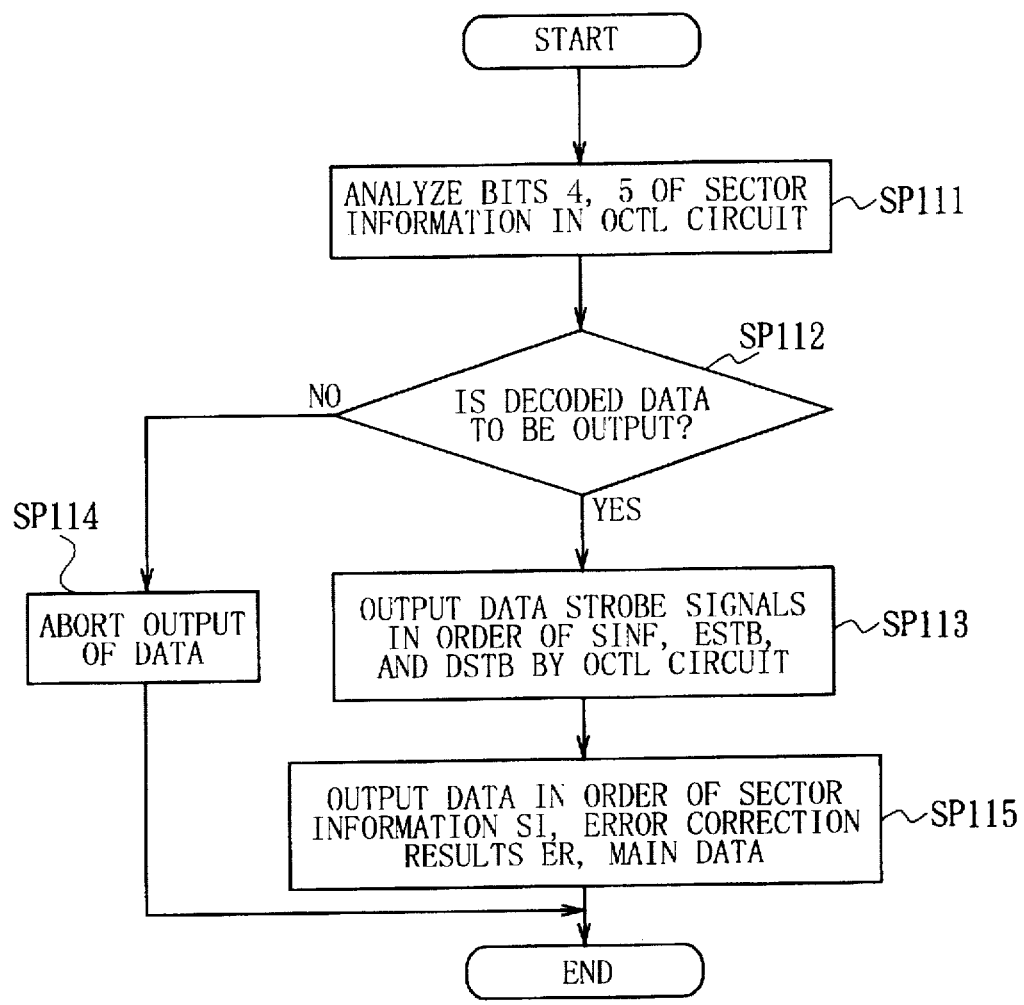
FIG. 44 is a flowchart diagram showing a data output process.

RAM controller 1812 presets priority levels for these three signals and sequentially outputs an acknowledge (ACK) signal to RAM 1818 according to the priority levels if these requests are simultaneously submitted. EFMACK (FIG. 41D), OUTACK (FIG. 41E), and ECCACK (FIG. 41F) are acknowledge signals for EFMREQ, OUTREQ, and ECCREQ, respectively. Preferably, the priority levels are set in the order of OUTREQ, EFMREQ, and ECCREQ. Thus, RAM controller 1812 outputs an ACK signal for the corresponding REQ signal according to the priority levels, as shown in FIG. 44. These signals are received in synchronism with C11M (FIG. 41G) used as a system clock.

As described above, according to the present invention, an access to RAM 1818 is granted in response to EFMREQ, ECCREQ, or OUTREQ during each specified cycle. This cycle, however, can be changed according to the configuration or type of RAM 1818 or the access speed.

FIG. 42 shows the number of accesses to RAM 1818 which are required to execute the PI1, PI2, and PO corrections of the data in one ECC block. As shown, the number of accesses to RAM 1818 which are required to execute PI1, PO, and PI2 corrections is 214,716 per ECC block, and the average value per main frame is 1,033. For example, the number of accesses to RAM 1818 during a write of EFM+ demodulated data is 182 per main frame, and the ECC execution cycle length is 208 bytes (208 main frames), so 37,856 (=182×208) accesses are required per block. The above value is obtained by calculating the number of required accesses for each operation and adding together all the values obtained.

FIGS. 43A to 43F are timing charts showing the timing for the output of error correction results data ER from RAM 1818 via OCTL circuit 1822. In this figure, the time base for the portion prior to the 182 SDCKs shown in FIGS. 35E, 36E, and 37E is extended. SDCK (FIG. 43A) designates a clock signal used to output ER as stream data. SINF (FIG. 43B) is a sector information strobe signal that becomes H at the beginning of a sector and which indicates that transferred data is sector information (SI). ESTB (FIG. 43C) is an error correction results strobe signal that, upon becoming H, indicates that error correction results ER will be transferred. In each PI row, one byte is assigned to each of the error correction results ER for the PI1, PO, and PI2 series, so the results data occupies three bytes in total. Since this data is output in the order in which it is stored (FIG. 21), the series with which a particular result is associated can be identified by checking bits 5 and 6 (FIG. 40) of the data. For the PI rows for which the results of PO corrections are not output, ESTB becomes L when such results are output.

DSTB (FIG. 43D) is a data strobe signal that is H when a signal SD[7:0] (FIG. 43E) is main data. Three of these signals, SINF, ESTB, and DSTB are generated by OCTL circuit 1822. The sector information SI and the error correction results ER are output immediately before the data in the direction of the PI rows is output using 182 SDCKs, as shown in FIG. 43E.

OUTF (the interpolation flag) (FIG. 43F) is an error flag for main data which is added to main data before output based on the PI and PO uncorrectable error flags stored in FLAG RAM 3906.

OCTL circuit 1822 determines from bits 4 and 5 (FIG. 29) of the sector information generated by SBCD circuit 1810 whether or not the data in the sector for which decoding has been finished should be output. Bits 4 and 5 of the sector information indicate end and start sectors, respectively, as shown in FIG. 29. OCTL circuit 1822 thus outputs sector data with bit 4=0 and bit 5=1 as the data in the specified sector (the data in which should be output).

OCTL circuit 1822 also determines whether, for example, the presence of error flags for the main data or the EDC results meets conditions preset by host CPU 1814, and if so, outputs decode data. Otherwise, it aborts outputting decode data and informs host CPU 1814 of the error.

For example, data output conditions are preferably as follows:

(1) The data shall be specified for output.
(2) No errors shall be detected from the ECC results.
(3) No error flags shall be added to the main data.

If these output conditions have been set, data meeting all these conditions is finally output. In addition, despite these conditions, host CPU 1814 can compulsorily prohibit data output.

OCTL circuit 1822 sequentially outputs the main data, sector information SI, and error correction result ER in the order of the output sequence of the sector data shown in FIG. 44.

OCTL circuit 1822 in step SP111 first analyzes the result of end sector detection stored in bit 4 in the sector information SI and the result of start sector detection stored in bit 5. As a result, it is determined that the data in which the bit 4 is 0 and the bit 5 is 1 is to be output.

Processing proceeds with step SP112 in which it is determined whether decoded data should be output. If not, processing passes to step SP114 to abort the data output operation. Abort is achieved, for example, by ending the data strobe signal by OCTL circuit 1822. On the other hand, if it is determined that the decoded data meets output conditions and is to be output, processing passes to step SP113.

In step SP113, OCTL circuit 1822 generates each strobe signal of the output data and outputs: a strobe signal SINF for the sector information SI (FIG. 43B), a strobe signal ESTB for error correction result ER (FIG. 43C), and a strobe signal DSTB for main data (FIG. 43D), in that order. Processing proceeds with step SP115. In step SP115, OCTL circuit 1822 in outputs the data in the order of the sector information SI, error correction result ER, and main data (D0, D1, D2 . . . ). Once all the sector data is output, the output of sector data will be terminated.

In the above-described embodiment, the data transferred from RAM 1818 to ECC core circuit 1820 during a data transfer period of 182 MWRQs (PI1-R, PO-R, and PI2-R (FIGS. 35A to 35E, 36A to 36E, and 37A to 37E) is read from the RAM according to the transfer clock (ECCK). In this case, by stopping the transfer clock (ECCK) for a specified period of time between the data transfer periods (PI1-R, PO-R, and PI2-R), the transfer of the data (PI1-R, PO-R, and PI2-R) is stopped during this stop period. That is, a period of time in which data is not transferred can be formed between the series of data (PI1-R, PO-R, and PI2-R).

During this stop period, RAM controller 1812 reads the corresponding data from RAM 1818 by using the error position information and correction pattern in ERR FIFO (the error register) 3904 by transferring the main data through ECC core circuit 1820 to ECC controller 1816, and corrects errors by executing exclusive logical additions with EX-OR circuit 3908 and writes the corrected data back to RAM 1818 to execute ECC processing.

After PI1 correction (PI1-W) is executed, RAM controller 1812 reads the error detecting code IED corresponding to the sector address information ID stored in the main frame numbered 0 which is stored in RAM 1818 at the timing of SUB (FIGS. 35B, 36B, and 37B) and transfers them to SBCD circuit 1810. If SECD circuit 1810 detects a physical sector address ID, it generates sector information SI according to the interpolation flag generation mode, start sector, and end sector, assigned by the host CPU 140, and writes this information to RAM 1818 so as to correspond to a predetermined PI row.

RAM controller 1812, when writing the EFM+ demodulated data to RAM 1818, reads the error-corrected main data based on the OUTREQ (FIG. 41B) together with the sector information SI and the error correction result ER from RAM 1818 and transfers this information to OCTL circuit 1822.

If OCTL circuit 1822 determines that the sector data decoded based on the sector information SI is to be output, it generates a strobe signal SINF of the sector information SI, a strobe signal ESTB of the error correction result ER, and a strobe signal DSTB of the main data and outputs each, in that order. Thus, as shown in FIGS. 43A to 43F, the data will be output in the order of the sector information SI, error correction result ER, and main data (D0, D1, D2 . . . ).

As described above, on outputting the sector data, the error correction results ER including 3 bytes of the PI, PO and PI2 corrections, and the main data is output following the sector information SI. At this point, by analyzing the bits 5 and 6 in the error correction results ER, whether the error correction result is PI or PO (bit 6) and PI1 or PI2 can be easily determined.

Further, the main data D0 leading the sector data includes the sector address information ID so that the physical address corresponding to the error correction results ER (the address on the optical disk 104) can be easily determined.

According to the above configuration, by outputting the sector information SI and the error correction results ER immediately before outputting the main data of the decoded ECC block data, the error correction result ER in sector unit of main data and the sector address information on the optical disk 104 can be obtained approximately simultaneously with the output of the main data. Thus an ECC error analysis corresponding to the sector address information can be easily conducted.

As described above, according to the present invention, a data decoding device and its method can be realized such that when coded data recorded on a recording medium is read therefrom and decoded, decoding information of the decoded data corresponding to address data of the coded data recorded on the recording medium can be read. Thus, the condition of the recording medium can be easily analyzed by considering the decoding information corresponding to that address data.

Furthermore, according to the present invention, in a data reproducing device for reproducing a video signal and/or an audio signal, a data reproducing device can be realized such that when coded data is read from a recording medium and decoded, decoding information of the decoded data corresponding to address data of the coded data recorded on the recording medium can be read. Thus, the condition of the recording medium can be easily analyzed by considering the decoding information corresponding to that address data.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A data decoding apparatus for error correction decoding an error correction encoded data reproduced from a recording medium, said apparatus comprising:

error correction decoding means for error correction decoding said error correction encoded data to produce a decoded data in frame units and for generating a decoding information in frame units;

memory means for storing said error correction encoded data, said decoded data, and said decoding information; and memory control means, coupled to said error correction decoding means and to said memory means, for controlling said memory means to store said decoded data and said decoding information in correspondence by frame unit and for retrieving said decoded data and said decoding information from said memory means while frame synchronizing with an address data representing a physical location of said error correction encoded data on said recording medium.

2. The data decoding apparatus according to claim 1, wherein said error correction encoded data is encoded according to a C1/C2 convolution Reed Solomon code.

3. The data decoding apparatus according to claim 2, wherein said memory control means stores said decoded data and said decoding information in said memory means in correspondence by each error correction code series of said C1/C2 convolution Reed Solomon code.

4. The data decoding apparatus according to claim 1, wherein said recording medium is a disc-shaped storage medium on which said error correction encoded data is stored in sectors.

5. The data decoding apparatus according to claim 4, wherein said memory control means retrieves said decoded data and said decoding information from said memory means while synchronizing with a sector address of said error correction encoded data stored on said disc-shaped storage medium.

6. The data decoding apparatus according to claim 1, wherein said error correction encoded data is produced by encoding a frame of a user data with an error correction inner code in a column direction of said frame to produce a column encoded frame and by encoding said column encoded frame with an error correction outer code in a row direction of said frame.

7. The data decoding apparatus according to claim 6, wherein said error correction decoding means decodes said error correction encoded data by a block in a column unit;

wherein said error correction decoding means decodes said error correction encoded data by a block in a row unit; and wherein said error correction decoding means decodes said error correction encoded data in said column unit again.

8. The data decoding apparatus according to claim 7, wherein said error correction decoding means comprises error correction means for error correcting said error correction encoded data as a function of an error position and an error pattern.

9. A data decoding method for error correction decoding an error correction encoded data reproduced from a recording medium, said method comprising the steps of:

error correction decoding said error correction encoded data to produce a decoded data in frame units;

generating a decoding information in frame units;

storing said error correction encoded data, said decoded data, and said decoding information;

storing said decoded data and said decoding information in correspondence by frame unit in a memory; and retrieving said decoded data and said decoding information from said memory while frame synchronizing with an address data representing a physical location of said error correction encoded data on said recording medium.

10. The data decoding method according to claim 9, wherein said error correction encoded data is encoded according to a C1/C2 convolution Reed Solomon code.

11. The data decoding method according to claim 10, further comprising the step of storing said decoded data and said decoding information in correspondence by each error correction code series of said C1/C2 convolution Reed Solomon code.

12. The data decoding method according to claim 9, wherein said recording medium is a disc-shaped storage medium on which said error correction encoded data is stored in sectors.

13. The data decoding method according to claim 12, further comprising the step of retrieving said decoded data and said decoding information while synchronizing with a sector address of said error correction encoded data stored on said disc-shaped storage medium.

14. The data decoding method according to claim 9,
wherein said error correction encoded data is produced by encoding a frame of a user data with an error correction inner code in a column direction of said frame to produce a column encoded frame and by encoding said column encoded frame with an error correction outer code in a row direction of said frame.

15. The data decoding method according to claim 14, wherein said step of error correction decoding comprises the steps of:
decoding said error correction encoded data by a block in a column unit;
decoding said error correction encoded data by a block in a row unit; and
decoding said error correction encoded data in said column unit again.

16. The data decoding method according to claim 15, wherein said step of error correction decoding comprises the step of error correcting said error correction encoded data as a function of an error position and an error pattern.

17. A data reproducing apparatus for reproducing an error corrected encoded data from a recording medium comprises:
reproducing means for reproducing said error corrected encoded data from said recording medium;
error correction decoding means, coupled to said reproducing means, for error correction decoding said error correction encoded data to produce a decoded data in frame units and for generating a decoding information in frame units;
memory means for storing said error correction encoded data, said decoded data, and said decoding information; and
memory control means, coupled to said error correction decoding means and to said memory means, for controlling said memory means to store said decoded data and said decoding information in correspondence by frame unit and for retrieving said decoded data and said decoding information from said memory means while frame synchronizing with an address data representing a physical location of said error correction encoded data on said recording medium.

18. The data reproducing apparatus according to claim 17, wherein said error correction encoded data is encoded according to a C1/C2 convolution Reed Solomon code.

19. The data reproducing apparatus according to claim 18, wherein said memory control means stores said decoded data and said decoding information in said memory means in correspondence by each error correction code series of said C1/C2 convolution Reed Solomon code.

20. The data reproducing apparatus according to claim 17, wherein said recording medium is a disc-shaped storage medium on which said error correction encoded data is stored in sectors.

21. The data reproducing apparatus according to claim 20, wherein said memory control means retrieves said decoded data and said decoding information from said memory means while synchronizing with a sector address of said error correction encoded data stored on said disc-shaped storage medium.

22. The data reproducing apparatus according to claim 17, wherein said error correction encoded data is produced by encoding a frame of a user data with an error correction inner code in a column direction of said frame to produce a column encoded frame and by encoding said column encoded frame with an error correction outer code in a row direction of said frame.

23. The data reproducing apparatus according to claim 22, wherein said error correction decoding means decodes said error correction encoded data by a block in a column unit;
wherein said error correction decoding means decodes said error correction encoded data by a block in a row unit; and
wherein said error correction decoding means decodes said error correction encoded data in said column unit again.

24. The data reproducing apparatus according to claim 23, wherein said error correction decoding means comprises error correction means for error correcting said error correction encoded data as a function of an error position and an error pattern.

* * * * *